United States Patent
Hosseini

(10) Patent No.: US 11,720,855 B2
(45) Date of Patent: Aug. 8, 2023

(54) METHOD AND APPARATUS FOR AUTOMATED SWIFT GENERATION OR MODIFICATION

(71) Applicant: JPMorgan Chase Bank, N.A., New York, NY (US)

(72) Inventor: Mahmood Hosseini, Bournemouth (GB)

(73) Assignee: JPMORGAN CHASE BANK. N.A., New York, NY (US)

( * ) Notice: Subject to any disclaimer, the term of this patent is extended or adjusted under 35 U.S.C. 154(b) by 488 days.

(21) Appl. No.: 16/917,070

(22) Filed: Jun. 30, 2020

(65) Prior Publication Data

US 2021/0406829 A1 Dec. 30, 2021

(51) Int. Cl.
| | |
|---|---|
| G06F 16/00 | (2019.01) |
| G06Q 10/10 | (2023.01) |
| G06Q 40/02 | (2023.01) |
| G06Q 30/018 | (2023.01) |
| H04L 51/046 | (2022.01) |
| G06F 40/186 | (2020.01) |
| G06F 40/18 | (2020.01) |

(Continued)

(52) U.S. Cl.
CPC ......... *G06Q 10/10* (2013.01); *G06F 16/116* (2019.01); *G06F 16/1794* (2019.01); *G06F 16/258* (2019.01); *G06F 40/18* (2020.01); *G06F 40/186* (2020.01); *G06Q 30/0185* (2013.01); *G06Q 40/02* (2013.01); *H04L 51/046* (2013.01); *H04L 67/55* (2022.05)

(58) Field of Classification Search
None
See application file for complete search history.

(56) References Cited

U.S. PATENT DOCUMENTS

| 9,063,978 | B1 * | 6/2015 | Kapoor | ................... G06F 8/20 |
| 9,454,526 | B1 * | 9/2016 | Kapoor | ............ G06F 16/24564 |

(Continued)

FOREIGN PATENT DOCUMENTS

| CN | 101866334 | * 10/2010 | ............ G06F 17/24 |

OTHER PUBLICATIONS

The common asset services platform, Bermingham Gerard (Year: 2012).*

*Primary Examiner* — Jean M Corrielus
(74) *Attorney, Agent, or Firm* — Greenblum & Bernstein, P.L.C.

(57) ABSTRACT

Various methods, apparatuses/systems, and media for automatically generating and/or updating corporate action swift (society for worldwide interbank financial telecommunication) messages are provided. A processor accesses a database that stores a plurality of static data sheets each including different type of static data; accesses a plurality of corporate action swift generator sheets each configured to link to the plurality of static data sheets from the database and generate a certain type of swift in an MT56x family of swift; implements a template that is linked to the plurality of corporate action swift generator sheets to access a desired static data sheet; automatically generates a corporate action MT56x family of swift message based on the template and the desired static data sheet; and automatically creates an MT56x swift file as output for the generated corporate action MT56x family of swift message in either a text file format or an excel file format.

20 Claims, 11 Drawing Sheets

(51) Int. Cl.
*G06F 16/11* (2019.01)
*H04L 67/55* (2022.01)
*G06F 16/178* (2019.01)
*G06F 16/25* (2019.01)

(56) References Cited

U.S. PATENT DOCUMENTS

| | | | | |
|---|---|---|---|---|
| 10,282,454 | B2* | 5/2019 | Greene | G06F 16/252 |
| 2010/0211422 | A1* | 8/2010 | Zanzot | G06Q 20/102 |
| | | | | 705/40 |
| 2012/0143903 | A1* | 6/2012 | Scully | G06Q 40/00 |
| | | | | 715/764 |
| 2013/0246303 | A1* | 9/2013 | Finck | G06Q 40/06 |
| | | | | 705/36 R |
| 2013/0339187 | A1* | 12/2013 | Carter | G06Q 20/102 |
| | | | | 705/26.41 |
| 2015/0363374 | A1* | 12/2015 | Lees | G06F 8/71 |
| | | | | 715/256 |
| 2017/0316068 | A1* | 11/2017 | Greene | G06F 16/252 |

* cited by examiner

METHOD AND APPARATUS FOR AUTOMATED SWIFT GENERATION OR MODIFICATION

TECHNICAL FIELD

This disclosure generally relates to SWIFT (Society for Worldwide Interbank Financial Telecommunication) message generation or modification, and, more particularly, to methods and apparatuses for implementing a COAC (Corporate Action) SWIFT generation module for automatically generating or modifying COAC SWIFT messages.

BACKGROUND

Producing new and/or modifying previously existing swift messages for COAC notifications (i.e., the MT56x family of swift messages) may prove to be a time-consuming task, usually taking around five minutes end to end, involving finding the right swift message and changing several details in a swift message before it can be pushed via designated systems. Typically, hundreds of SWIFT messages are pushed via messaging technology weekly as part of UAT (user acceptance testing)/Product testing in CPCS (Cross Product Change Services) teams across the globe. Preparing each SWIFT manually usually requires the following steps: the user may need to find the correct SWIFT message text file from the designated folder; the user then needs to open the SWIFT text file and change/update several required fields, such as Sender BIC (Business Identifier Code), Receiver BIC, Message IDs, Asset IDs, and most/all the date fields; for most changes in the SWIFT data, the user may also need to obtain the data from other sources, usually static data sources for UAT; the user may need to open several files simultaneously on desktop, and may need to manually find, cross-reference, and update those field data from the source file into the SWIFT text file; and the user then needs to save the SWIFT text file, usually in a different file and/or folder.

However, this manual process of SWIFT message generation and/or modification may prove to be time-consuming and error-prone. For example, finding the correct SWIFT file can be time-consuming. Moreover, certain SWIFT files might not exist in the repository, or be outdated. Manual changes may also be prone to human input errors such as typos. For example, while changing details of a swift message, typos may also occur which may make the swift useless once pushed. In addition, finding the right data may prove to be cumbersome and sometimes may need input from several files, which may increase human error.

SUMMARY

The present disclosure, through one or more of its various aspects, embodiments, and/or specific features or sub-components, may provide, among others, various systems, servers, devices, methods, media, programs, and platforms for implementing a COAC SWIFT generation module for automatically generating or modifying COAC SWIFT messages, thereby allowing creation or modification of COAC swift messages in a matter of seconds (i.e., less than 30 seconds) instead of several minutes, but the disclosure is not limited thereto. In addition, the present disclosure, through one or more of its various aspects, embodiments, and/or specific features or sub-components, may further provide, among others, various systems, servers, devices, methods, media, programs, and platforms for implementing a COAC SWIFT generation module for automatically generating or modifying COAC SWIFT messages, thereby resulting the following non limiting exemplary advantages over conventional systems and methods: allowing a user to find all SWIFT messages in one place/platform; requiring minimal input in generating the SWIFT: allowing user to input from drop-down menus, thereby removing possibilities of human error; when user input needs to be free-format text, implementing rules to minimize the human input error (i.e., prompting an automatic error message to the user if the SWIFT message ID is input having more than sixteen (16) characters); allowing certain aspects of the SWIFT generation to be fully automated (i.e., a user may not need to worry about the market and asset ID matching, since by choosing the right market, the COAC SWIFT generation module will automatically generate the corresponding asset ID as well); implementing embedded capabilities where user input may override system input (i.e., when users need their own asset IDs or currencies, they may override system-generated data); when all SWIFT details are selected, saving the SWIFT text file through an one-click operation, etc. Consequently, using the COAC SWIFT generation module of the instant disclosure can save thousands of minutes of user time via automation and human-error minimization across wider CPCS team.

According to an aspect of the present disclosure, a method for generating corporate action swift (society for worldwide interbank financial telecommunication) messages by utilizing one or more processors and one or more memories is disclosed. The method may include: accessing a database that stores a plurality of static data sheets each including different type of static data; accessing a plurality of corporate action swift generator sheets each configured to link to the plurality of static data sheets from the database and generate a certain type of swift in an MT56x family of swift: implementing a template that is linked to the plurality of corporate action swift generator sheets to access a desired static data sheet; automatically generating a corporate action MT56x family of swift message based on the template and the desired static data sheet; and automatically creating an MT56x swift file as output for the generated corporate action MT56x family of swift message in either a text file format or an excel file format.

According to another aspect of the present disclosure, the plurality of static data sheets include a static data sheet of asset identifiers, a static data sheet of administrative FI codes, a static data sheet of business identifier codes, and a static data sheet of corporate action event or corporate action mandatory/voluntary or combinations thereof.

According to yet another aspect of the present disclosure, the method may further include: implementing a pre-designed template configured to link with a corporate action swift generator sheet corresponding to MX20022 among the plurality of corporate action swift generator sheets: automatically generating a corporate action MX20022 swift message based on the pre-designed template and the desired static data sheet; and automatically creating an MX20022 swift file as output for the generated corporate action MX20022 swift message in a .csv file format.

According to a further aspect of the present disclosure, the method may further include: implementing a pre-designed template configured to link with a corporate action swift generator sheet corresponding to MT564 in the MT56x family of swift among the plurality of corporate action swift generator sheets; automatically generating a corporate action MT564 swift message based on the pre-designed template and the desired static data sheet: and automatically creating an MT564 swift file as output for the generated corporate action MT564 swift message in either a .txt file format or an .xls file format.

According to yet another aspect of the present disclosure, the template is configured to link with a corporate action swift generator sheet corresponding to MT565 in the MT56x family of swift among the plurality of corporate action swift generator sheets, and the method may further include: automatically generating a corporate action MT565 swift message based on the template and the desired static data sheet: and automatically creating an MT565 swift file as output for the generated corporate action MT565 swift message in either a .txt file format or an .xls file format.

According to an additional aspect of the present disclosure, the template is configured to link with a corporate action swift generator sheet corresponding to MT566 in the MT56x family of swift among the plurality of corporate action swift generator sheets, and the method may further comprise: automatically generating a corporate action MT566 swift message based on the template and the desired static data sheet; and automatically creating an MT566 swift file as output for the generated corporate action MT566 swift message in either a .txt file format or an .xls file format.

According to yet another aspect of the present disclosure, the template is configured to link with a corporate action swift generator sheet corresponding to MT567 in the MT56x family of swift among the plurality of corporate action swift generator sheets, and the method may further include: automatically generating a corporate action MT567 swift message based on the template and the desired static data sheet; and automatically creating an MT567 swift file as output for the generated corporate action MT567 swift message in either a .txt file format or an .xls file format.

According to another aspect of the present disclosure, the method may further include: overriding automatically generated corporate action MT56x family of swift message by receiving user input.

According to further aspect of the present disclosure, the method may further include updating the plurality of static data sheets in a predetermined periodic manner.

According to yet another aspect of the present disclosure, the method may further include: creating an MT564 swift file for generated MT564 swift messages as .txt or .xls file format; creating an MT565 swift file for generated MT565 swift messages as .txt or .xls file format; creating an MT566 swift file for generated MT566 swift messages as .txt or .xls file format; creating an MT567 swift file for generated MT567 swift messages as .txt or .xls file format; creating an MX20022 swift file for generated MX20022 swift messages as .csv file format; and storing, onto a memory, all created swift files in the same folder.

According to an additional aspect of the present disclosure, the method may further include: receiving user input corresponding to a desired static data sheet: pasting the desired data sheet onto the template; and generating a corporate action swift message in the MT56x family of swift messages based on the desired static data sheet.

According to yet another aspect of the present disclosure, the method may further include: controlling user input in a manner to detect incorrect or faulty data as input; and blocking generation of corporate action swift messages with incorrect or faulty data based on the detection of incorrect or faulty data as input.

According to another aspect of the present disclosure, a system for generating corporate action swift (society for worldwide interbank financial telecommunication) messages is disclosed. The system may include: a database that stores a plurality of static data sheets each including different type of static data; and a processor operatively connected to the database via a communication network. The processor may be configured to: access a plurality of corporate action swift generator sheets each configured to link to the plurality of static data sheets from the database and generate a certain type of swift in an MT56x family of swift; implement a template that is linked to the plurality of corporate action swift generator sheets to access a desired static data sheet: automatically generate a corporate action MT56x family of swift message based on the template and the desired static data sheet; and automatically create an MT56x swift file as output for the generated corporate action MT56x family of swift message in either a text file format or an excel file format.

According to an additional aspect of the present disclosure, the processor may be further configured to: implement a pre-designed template configured to link with a corporate action swift generator sheet corresponding to MX20022 among the plurality of corporate action swift generator sheets: automatically generate a corporate action MX20022 swift message based on the pre-designed template and the desired static data sheet; and automatically create an MX20022 swift file as output for the generated corporate action MX20022 swift message in a .csv file format.

According to another aspect of the present disclosure, the processor may be further configured to: create an MT564 swift file for generated MT564 swift messages as .txt or .xls file format; create an MT565 swift file for generated MT565 swift messages as .txt or .xls file format; create an MT566 swift file for generated MT566 swift messages as .txt or .xls file format; create an MT567 swift file for generated MT567 swift messages as .txt or .xls file format; create an MX20022 swift file for generated MX20022 swift messages as .csv file format; and storing, onto a memory, all created swift files in the same folder.

According to yet another aspect of the present disclosure, the processor may be further configured to: receive user input corresponding to a desired static data sheet; paste the desired data sheet onto the template: and generate a corporate action swift message in the MT56x family of swift messages based on the desired static data sheet.

According to a further aspect of the present disclosure, the processor may be further configured to: control the user input in a manner to detect incorrect or faulty data as input; and block generation of corporate action swift messages with incorrect or faulty data based on the detection of incorrect or faulty data as input.

According to an aspect of the present disclosure, a non-transitory computer readable medium configured to store instructions for generating corporate action swift (society for worldwide interbank financial telecommunication) messages is disclosed. The instructions, when executed, may cause a processor to perform the following: accessing a database that stores a plurality of static data sheets each including different type of static data; accessing a plurality of corporate action swift generator sheets each configured to link to the plurality of static data sheets from the database and generate a certain type of swift in an MT56x family of swift; implementing a template that is linked to the plurality of corporate action swift generator sheets to access a desired static data sheet; automatically generating a corporate action MT56x family of swift message based on the template and the desired static data sheet; and automatically creating an MT56x swift file as output for the generated corporate action MT56x family of swift message in either a text file format or an excel file format.

According to still another aspect of the present disclosure, the instructions, when executed, may further cause the processor to perform the following: implementing a pre-designed template configured to link with a corporate action swift generator sheet corresponding to MX20022 among the plurality of corporate action swift generator sheets; automatically generating a corporate action MX20022 swift message based on the pre-designed template and the desired static data sheet: and automatically creating an MX20022 swift file as output for the generated corporate action MX20022 swift message in a .csv file format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
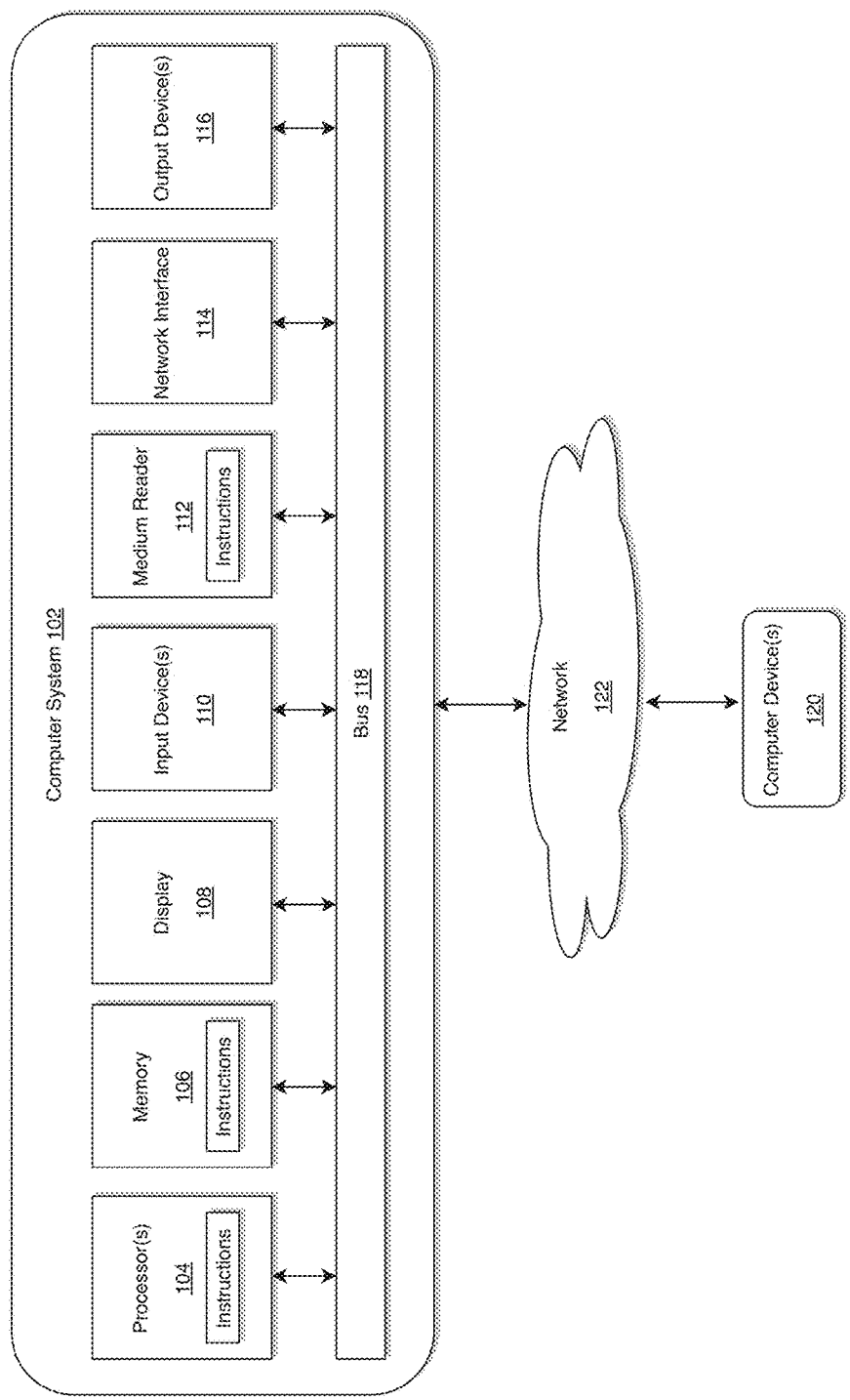
FIG. 1 illustrates a computer system for implementing a COAC SWIFT generation device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desk-top computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and am non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (OPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment . . . .

As described herein, various embodiments provide optimized processes of implementing a COAC SWIFT generation module for automatically generating or modifying COAC SWIFT messages, thereby allowing creation or modification of COAC swift messages in a matter of seconds (i.e., less than 30 seconds) instead of several minutes, but the disclosure is not limited thereto. As described herein, various embodiments may further provide optimized processes of implementing a COAC SWIFT generation module for automatically generating or modifying COAC SWIFT messages, thereby resulting the following non limiting exemplary advantages over conventional systems and methods: allowing a user to find all SWIFT messages in one place/platform, requiring minimal input in generating the SWIFT; allowing user to input from drop-down menus, thereby removing possibilities of human error; when user input needs to be free-format text, implementing rules to minimize the human input error (i.e., prompting an automatic error message to the user if the SWIFT message ID is input having more than sixteen (16) characters); allowing certain aspects of the SWIFT generation to be fully automated (i.e., a user may not need to worry about the market and asset ID matching, since by choosing the right market, the COAC SWIFT generation module will automatically generate the corresponding asset ID as well); implementing embedded capabilities where user input may override system input (i.e., when users need their own asset IDs or currencies, they may override system-generated data); when all SWIFT details are selected, saving the SWIFT text file through an one-click operation, etc. Consequently, using the COAC SWIFT generation module of the instant disclosure can save thousands of minutes of user time via automation and human-error minimization across wider CPCS team.

Figure 2:
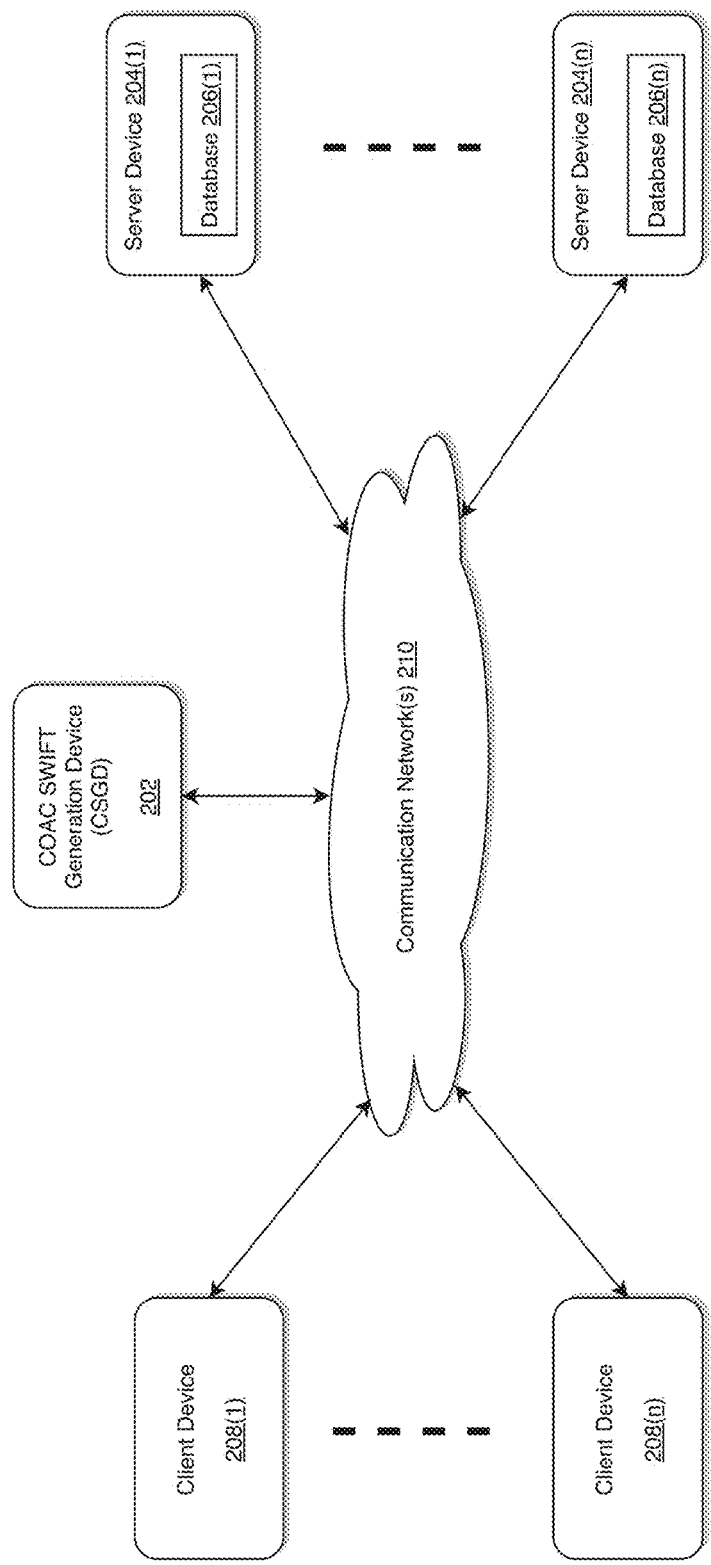
FIG. 2 illustrates an exemplary diagram of a network environment with a implementing a COAC SWIFT generation device in accordance with an exemplary embodiment.

Referring to FIG. 2, a schematic of an exemplary network environment 200 for implementing a COAC SWIFT generation device (CSGD) of the instant disclosure is illustrated.

Conventional system, that does not implement a CSGD of the instant disclosure, may not be able to create or modify COAC swift messages in an efficient manner, i.e., in a matter of seconds.

According to exemplary embodiments, the above-described problems associated with conventional system may be overcome by implementing a CSGD 202 having a COAC SWIFT generation module as illustrated in FIG. 2 by allowing creation or modification of COAC swift messages in a matter of seconds (i.e., less than 30 seconds) instead of several minutes, but the disclosure is not limited thereto.

The CSGD 202 may be the same or similar to the computer system 102 as described with respect to FIG. 1.

The CSGD 202 may store one or more applications that can include executable instructions that, when executed by the CSGD 202, cause the CSGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CSGD 202 itself, may be located in virtual server(s) running in a cloud-based computing environment rather than being tied to one or more specific physical network computing devices. Also, the application(s) may be running in one or more virtual machines (VMs) executing on the CSGD 202. Additionally, in one or more embodiments of this technology, virtual machine(s) running on the CSGD 202 may be managed or supervised by a hypervisor.

In the network environment 200 of FIG. 2, the CSGD 202 is coupled to a plurality of server devices 204(1)-204(n) that hosts a plurality of databases 206(1)-206(n), and also to a plurality of client devices 208(1)-208(n) via communication network(s) 210. A communication interface of the CSGD 202, such as the network interface 114 of the computer system 102 of FIG. 1, operatively couples and communicates between the CSGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CSGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CSGD 202 may be a standalone device or integrated with one or more other devices or apparatuses, such as one or more of the server devices 204(1)-204(n), for example. In one particular example, the CSGD 202 may be hosted by one of the server devices 204(1)-204(n), and other arrangements are also possible. Moreover, one or more of the devices of the CSGD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CSGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CSGD 202 that may be configured for automatically generating or modifying COAC SWIFT messages, thereby allowing creation or modification of COAC swift messages in a matter of seconds (i.e., less than 30 seconds) instead of several minutes, but the disclosure is not limited thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the CSGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CSGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CSGD 202, the server devices 204(1)-204(n), or the client devices 208(1)-208(n), for example, may be configured to operate as virtual instances on the same physical machine. For example, one or more of the CSGD 202, the server devices 204(1)-204(n), or the client devices 208(1)-208(n) may operate on the same physical device rather than as separate devices communicating through communication network(s) 210. Additionally, there may be more or fewer CSGDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
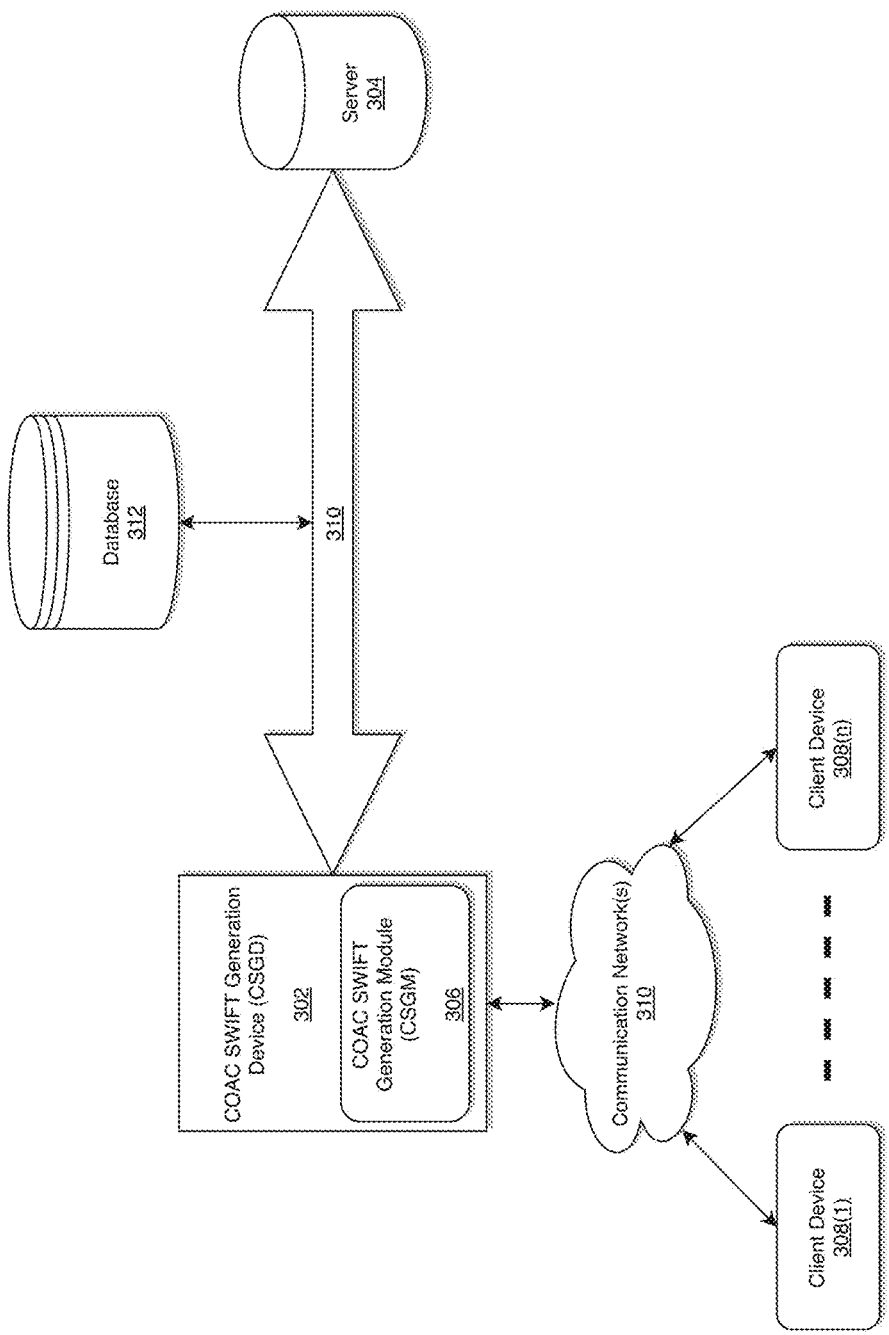
FIG. 3 illustrates a system diagram for implementing a implementing a COAC SWIFT generation device with a COAC SWIFT generation module in accordance with an exemplary embodiment.

FIG. 3 illustrates a system diagram for implementing a COAC SWIFT generation device (CSGD) with a COAC SWIFT generation module (CSGM) in accordance with an exemplary embodiment.

As illustrated in FIG. 3, the CSGD 302 including the CSGM 306 may be connected to a server 304, and database 312 via a communication network 310. The CSGD 302 may also be connected to a plurality of client devices 308(1)-308(n) via the communication network 310, but the disclosure is not limited thereto.

According to exemplary embodiment, the CSGD 302 is described and shown in FIG. 3 as including the CSGM 306, although it may include other rules, policies, modules, databases, or applications, for example. According to exemplary embodiments, the database 312 may be embedded within the CSGD 302. According to exemplary embodiments, the database 312 may be configured to store information including: rules, programs, test cases, framework templates, swift generation sheets, etc., but the disclosure is not limited thereto.

According to exemplary embodiments, the CSGM 306 may be configured to provide a much simpler way, compared to conventional methods or systems, to produce COAC SWIFT messages with only a few clicks, and it may be configured to be much less prone to human errors compared to conventional methods or systems. For example, the CSGM 306 may be configured to use the same static data (which can always be updated if and when necessary) along with the disclosed processes of auto-generating and populating date fields, reference fields, and linking the right securities to a chosen market. As a result, the CSGM 306 may be configured to allow for the creation (generation)/modification of COAC SWIFT messages in the MT56X SWIFT family in a matter of seconds instead of several minutes. In addition, according to exemplary embodiments, the CSGM 306 may be configured to allow for the creation (generation)/modification of MT20022 SWIFT messages in a matter of seconds instead of several minutes. Further, according to exemplary embodiments, the CSGM 306 may be configured to be fully automatic while allowing flexibility via manual input of certain features (e.g., when a user needs to use a certain security, he/she can manually add it instead of allowing the generator to decide which security to use).

According to exemplary embodiments, the CSGM 306 may be configured to receive data from the database 312 via the communication network 310.

As will be described below, the CSGM 306 may be configured to access a database 312 that stores a plurality of static data sheets each including different type of static data; access a plurality of corporate action swift generator sheets each configured to link to the plurality of static data sheets from the database and generate a certain type of swift in an MT56x family of swift, implement a template that is linked to the plurality of corporate action swift generator sheets to access a desired static data sheet; automatically generate a corporate action MT56x family of swift message based on the template and the desired static data sheet; and automatically create an MT56x swift file as output for the generated corporate action MT56x family of swift message in either a text file format or an excel file format, but the disclosure is not limited thereto.

The plurality of client devices 308(1)-308(n) are illustrated as being in communication with the CSGD 302. In this regard, the plurality of client devices 308(1)-308(n) may be "clients" of the CSGD 302 and are described herein as such. Nevertheless, it is to be known and understood that the plurality of client devices 308(1)-308(n) need not necessarily be "clients" of the CSGD 302, or any entity described in association therewith herein. Any additional or alternative relationship may exist between either or more of the plurality of client devices 308(1)-308(n) and the CSGD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the CSGD 302 via broadband or cellular communication. Of course, these embodiments are merely exemplary and are not limiting or exhaustive.

Figure 4:
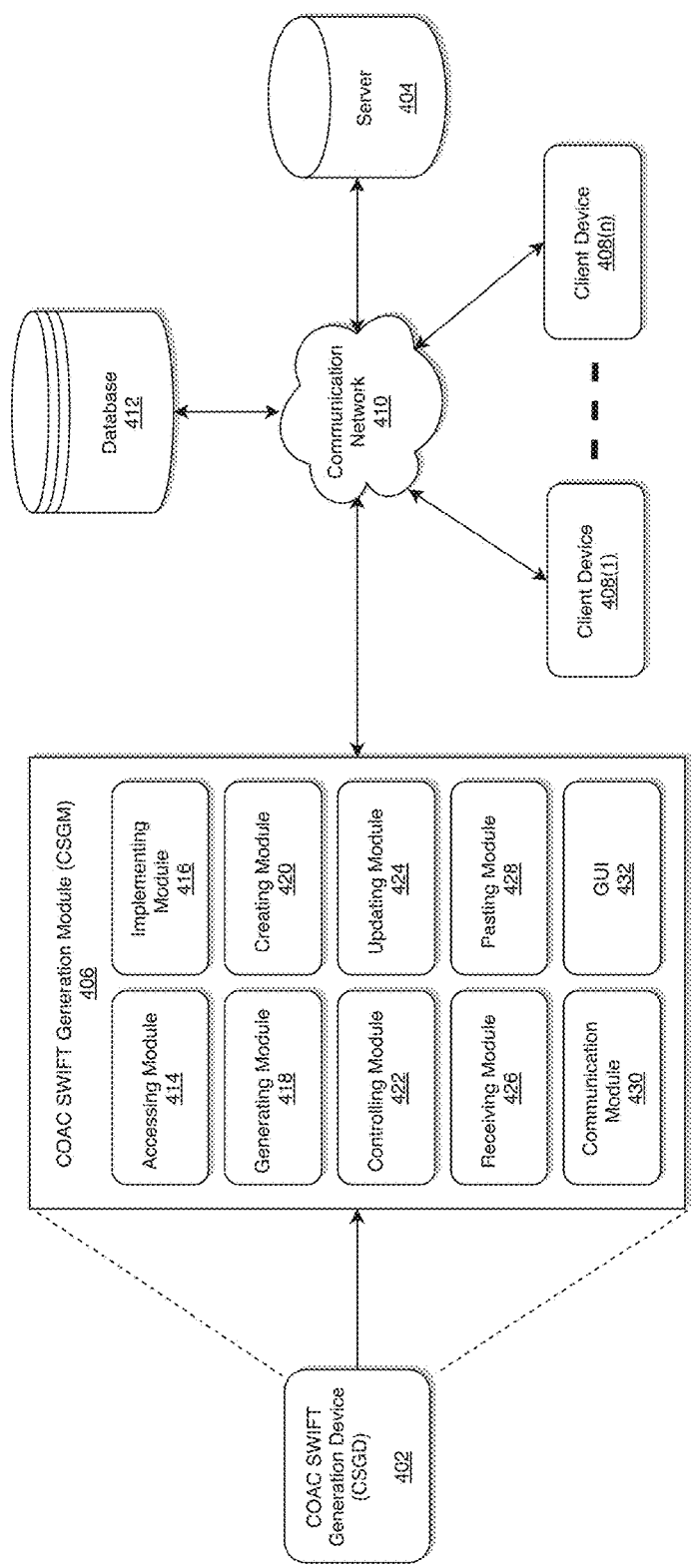
FIG. 4 illustrates a system diagram for implementing a implementing a COAC SWIFT generation module of FIG. 3 in accordance with an exemplary embodiment.

FIG. 4 illustrates a system diagram for implementing a COAC SWIFT generation module of FIG. 3 in accordance with an exemplary embodiment. As illustrated in FIG. 4, the system 400 may include a COAC SWIFT generation device (CSGD) 402 within which a COAC SWIFT generation module (CSGM) 406 may be embedded, a database 412, a server 404, client devices 408(1)-408(n), and a communication network 410. According to exemplary embodiments, the CSGD 402, CSGM 406, database 412, the server 404, the client devices 408(1)-408(n), and the communication network 410 as illustrated in FIG. 4 may be the same or similar to the CSGD 302, CSGM 306, database 312, the server 304, the client devices 308(1)-308(n), and the communication network 310, respectively, as illustrated in FIG. 3.

As illustrated in FIG. 4, the CSGM 406 may include an accessing module 414, an implementing module 416, a generating module 418, a creating module 420, a controlling module 422, an updating module 424, a receiving module 426, a pasting module 428, a communication module 430, and a GUI 432. According to exemplary embodiments, the database 412 may be external to the CSGD 402 may include various systems that are managed and operated by an organization. Alternatively, according to exemplary embodiments, the database 412 may be embedded within the CSGD 402 and/or the CSGM 406.

The process may be executed via the communication network 410, which may comprise plural networks as described above. For example, in an exemplary embodiment, the various components of the CSGM 406 may communicate with the server 404, and the database(s) 412 via the communication network 410 and the communication module 430. Of course, these embodiments are merely exemplary and are not limiting or exhaustive.

According to exemplary embodiments, the communication network 410 and the communication module 430 may be configured to establish a link between the database 412, the client devices 408(1)-408(n) and the CSGM 406.

According to exemplary embodiments, each of the accessing module 414, implementing module 416, generating module 418, creating module 420, controlling module 422, updating module 424, receiving module 426, pasting module 428, and the communication module 430 may be implemented by microprocessors or similar, they may be programmed using software (e.g., microcode) to perform various functions discussed herein and may optionally be driven by firmware and/or software. Alternatively, each of the accessing module 414, implementing module 416, generating module 418, creating module 420, controlling module 422, updating module 424, receiving module 426, pasting module 428, and the communication module 430 may be implemented by dedicated hardware, or as a combination of dedicated hardware to perform some functions and a processor (e.g., one or more programmed microprocessors and associated circuitry) to perform other functions. Also, according to exemplary embodiments, each of the accessing module 414, implementing module 416, generating module 418, creating module 420, controlling module 422, updating module 424, receiving module 426, pasting module 428, and the communication module 430 may be physically separated into two or more interacting and discrete blocks, units, devices, and/or modules without departing from the scope of the inventive concepts.

Figure 5:
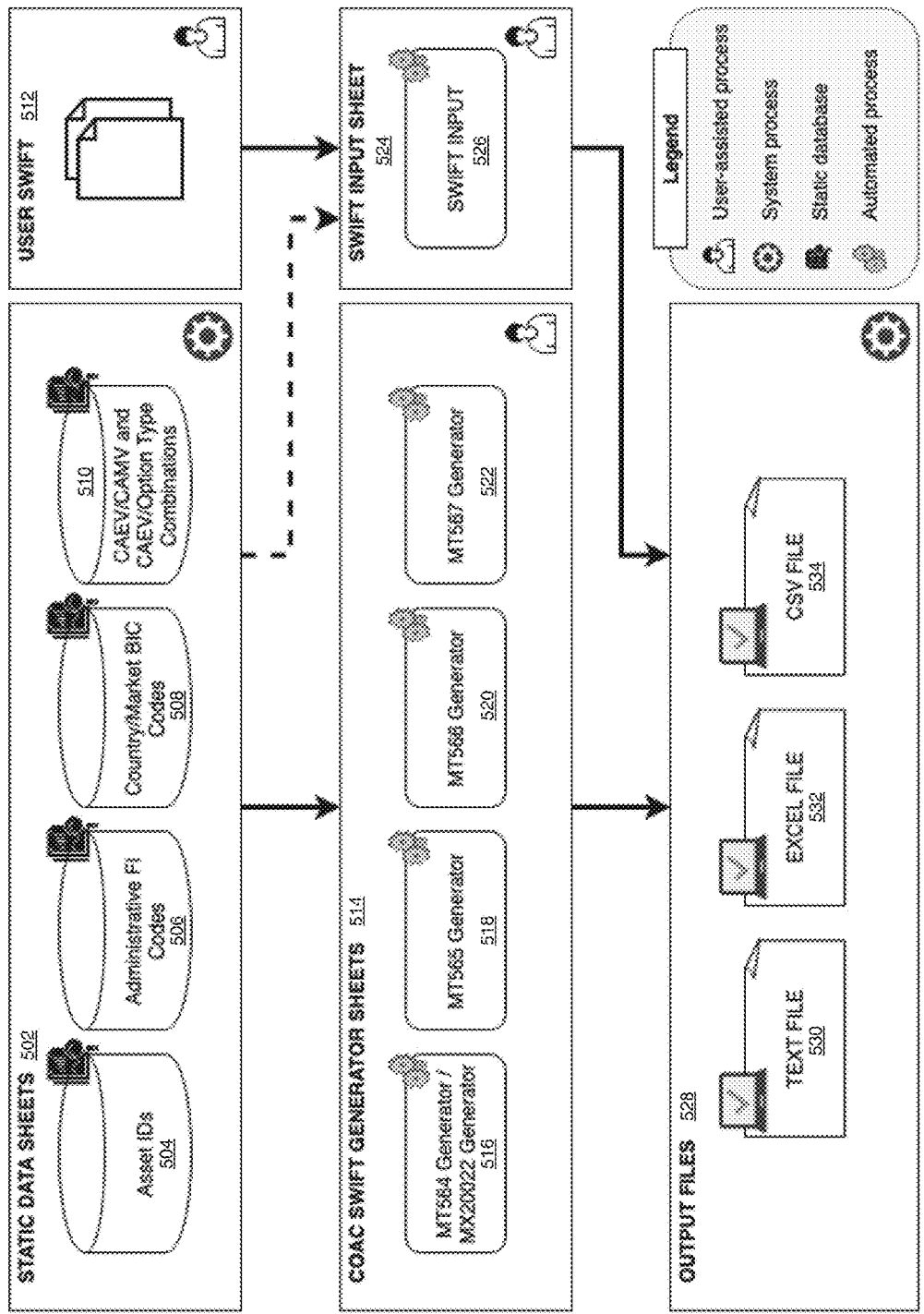
FIG. 5 illustrates an exemplary COAC SWIFT generation process in accordance with an exemplary embodiment.

According to exemplary embodiments, FIG. 5 illustrates an exemplary COAC SWIFT generation process in accordance with an exemplary embodiment. As illustrated in FIG. 5, the process 500 illustrates a static data sheets 502 that may include asset IDs 504, administrative FI codes 506, country/market BIC (business identifier) codes 508, CAEV (corporate action event)/CAMV (corporate action mandatory/voluntary) and CAEV/option type combinations 510. According to exemplary embodiments, the asset IDs 504, the administrative FI codes 506, the country/market BIC (business identifier) codes 508, the CAEV/CAMV and CAEV/option type combinations 510 may be stored onto corresponding static database (e.g., database 412 as illustrated in FIG. 4).

According to exemplary embodiments. FIG. 5 also illustrates a user swift 512 element to initiate user-assisted process.

As illustrated in FIG. 5, according to exemplary embodiments, the process 500 may also include a corporate action swift generator sheets 514 that may include an MT564 generator/MX20022 generator 516, an MT565 generator 518, MT566 generator 520, and an MT567 generator 522. Each of the MT564 generator/MX20022 generator 516, MT565 generator 518, MT566 generator 520, and the MT567 generator 522 are configured for automated process to generate corresponding swift messages.

According to exemplary embodiments, FIG. 5 also illustrates a swift input sheet 524 may include a swift input 526 element to initiate automated process.

As illustrated in FIG. 5, according to exemplary embodiments, the corporate action swift generator sheets 514 may be configured to be operatively connected with the static data sheets 502; the swift input sheet 524 may be configured to be operatively connected with the user swift 512 element as well as the static data sheets 502 (if user desires).

As illustrated in FIG. 5, according to exemplary embodiments, the process 500 may also include output files 528 section where outputs from the corporate action swift generator sheets 514 and/or the swift input sheet 524 may be presented onto a GUI 432. According to exemplary embodiments, the output files 528 may include a text file 530, an excel file 532, and a csv file 534.

Referring to FIGS. 4-5, according to exemplary embodiments, the accessing module 414 may be configured to access a database (e.g., database 412) that stores a plurality of static data sheets 502 each including different type of static data.

According to exemplary embodiments, the accessing module 414 may also be configured to access a plurality of corporate action swift generator sheets 514 each configured to link to the plurality of static data sheets 502 from the database 412 and generate a certain type of swift in an MT56x family of swift.

According to exemplary embodiments, the implementing module 416 may be configured to implement a template that is linked to the plurality of corporate action swift generator sheets 514 to access a desired static data sheet 502. The generating module 418 may be configured to automatically generate a corporate action MT56x family of swift message based on the template and the desired static data sheet 502. According to exemplary embodiments, the generating module 418 may include the MT564 generator/MX20022 generator 516, an MT565 generator 518, MT566 generator 520, and an MT567 generator 522. Each of the MT564 generator/MX20022 generator 516, MT565 generator 518, MT566 generator 520, and the MT567 generator 522.

According to exemplary embodiments, the creating module 420 may be configured to automatically create an MT56x swift file as output for the generated corporate action MT56x family of swift message in either a text file format (e.g., text file 530) or an excel file format (e.g., excel file 532).

According to exemplary embodiments, the implementing module 416 may be configured to implement a pre-designed template that is configured to link with a corporate action swift generator sheet corresponding to MX20022 among the plurality of corporate action swift generator sheets 514. The generating module 418 may be configured to automatically generate a corporate action MX20022 swift message based on the pre-designed template and the desired static data sheet 502 and the creating module 420 may be configured to automatically create an MX20022 swift file as output for the generated corporate action MX20022 swift message in a .csv file format (e.g., csv file 534).

According to exemplary embodiments, the implementing module 416 may be configured to implement code data transformation services as part of the data processing framework.

According to exemplary embodiments, the implementing module 416 may be configured to implement a pre-designed template configured to link with a corporate action swift generator sheet corresponding to MT564 in the MT56x family of swift among the plurality of corporate action swift generator sheets 514 and the generating module 418 (i.e., the MT564 generator 516) may be configured to automatically generate a corporate action MT564 swift message based on the pre-designed template and the desired static data sheet 502. According to exemplary embodiments, the creating module 420 embedded within the MT564 generator 516 may be configured to automatically create an MT564 swift file as output for the generated corporate action MT564 swift message in either a .txt file format (e.g., text file 530) or an .xls file format (e.g., excel file 532).

According to exemplary embodiments, the template may be configured to link with a corporate action swift generator sheet corresponding to MT565 in the MT56x family of swift among the plurality of corporate action swift generator sheets 514, and the generating module 418 (i.e., the MT565 generator 518) may be configured to automatically generate a corporate action MT565 swift message based on the template and the desired static data sheet 502 and the creating module 420 embedded within the MT565 generator 518 may be configured to automatically create an MT565 swift file as output for the generated corporate action MT565 swift message in either a .txt file format (e.g., text file 530) or an .xls file format (e.g., excel file 532).

According to exemplary embodiments, the template may be configured to link with a corporate action swift generator sheet corresponding to MT566 in the MT56x family of swift among the plurality of corporate action swift generator sheets 514, and the generating module 418 (i.e., the MT566 generator 520) may be configured to automatically generate a corporate action MT566 swift message based on the template and the desired static data sheet 502, and the creating module 420 embedded within the MT566 generator 520 may be configured to automatically create an MT566 swift file as output for the generated corporate action MT566 swift message in either a .txt file format (e.g., text file 530) or an .xls file format (e.g., excel file 532).

According to exemplary embodiments, the template may be configured to link with a corporate action swift generator sheet corresponding to MT567 in the MT56x family of swift among the plurality of corporate action swift generator sheets 514, and the generating module 418 (i.e., the MT567 generator 522) may be configured to automatically generate a corporate action MT567 swift message based on the template and the desired static data sheet, and the creating module 420 embedded within the MT567 generator 522 may be configured to automatically create an MT567 swift file as output for the generated corporate action MT567 swift message in either a .txt file format (e.g., text file 530) or an .xls file format (e.g., excel file 532).

According to exemplary embodiments, the controlling module 422 may be configured to override automatically generated corporate action MT56x family of swift message by receiving user input via the GUI 432.

According to exemplary embodiments, the updating module 424 may be configured to update the plurality of static data sheets 502 in a predetermined periodic manner.

According to exemplary embodiments, the creating module 420 embedded within the MT564 generator 516 may be configured to create an MT564 swift file for generated MT564 swift messages as .txt or .xls file format; the creating module 420 embedded within the MT565 generator 518 may be configured to create an MT565 swift file for generated MT565 swift messages as .txt or .xls file format: the creating module 420 embedded within the MT566 generator 520 may be configured to create an MT566 swift file for generated MT566 swift messages as .txt or .xls file format; the creating module 420 embedded within the MT567 generator 522 may be configured to create an MT567 swift file for generated MT567 swift messages as .txt or .xls file format; the creating module 420 embedded within the MX20022 generator 516 may be configured to create an MX20022 swift file for generated MX20022 swift messages as .csv file format: and the CSGM 406 may be configured to store, onto a memory, all created swift files in the same folder.

According to exemplary embodiments, the receiving module 426 may be configured to receive user input via GUI 432 corresponding to a desired static data sheet 502; the pasting module 428 may be configured to paste the desired data sheet 502 onto the template; and the generating module 418 may be configured to generate a corporate action swift message in the MT56x family of swift messages based on the desired static data sheet 502.

According to exemplary embodiments, the controlling module 422 may be configured to control user input in a manner to detect incorrect or faulty data as input; and block generation of corporate action swift messages with incorrect or faulty data based on the detection of incorrect or faulty data as input.

According to exemplary embodiments, a non-transitory computer readable medium may be configured to store instructions for integrating data. According to exemplary embodiments, the instructions, when executed, may cause a processor embedded within the CSGM 406 or the CSGD 402 to perform the following: accessing a database that stores a plurality of static data sheets each including different type of static data: accessing a plurality of corporate action swift generator sheets each configured to link to the plurality of static data sheets from the database and generate a certain type of swift in an MT56x family of swift; implementing a template that is linked to the plurality of corporate action swift generator sheets to access a desired static data sheet; automatically generating a corporate action MT56x family of swift message based on the template and the desired static data sheet; and automatically creating an MT56x swift file as output for the generated corporate action MT56x family of swift message in either a text file format or an excel file format. The processor may be the same or similar to the processor 104 as illustrated in FIG. 1 or the processor embedded within CSGD 202, CSGD 302, CSGM 306, CSGD 402, and CSGM 406.

According to exemplary embodiments, the instructions, when executed, may cause the processor 104 to: implement a pre-designed template that is configured to link with a corporate action swift generator sheet corresponding to MX20022 among the plurality of corporate action swift generator sheets; automatically generate a corporate action MX20022 swift message based on the pre-designed template and the desired static data sheet; and automatically create an MX20022 swift file as output for the generated corporate action MX20022 swift message in a .csv file format.

According to exemplary embodiments, the instructions, when executed, may cause the processor 104 to implement code data transformation services as part of the data processing framework.

According to exemplary embodiments, the instructions, when executed, may cause the processor 104 to: implement a pre-designed template configured to link with a corporate action swift generator sheet corresponding to MT564 in the MT56x family of swift among the plurality of corporate action swift generator sheets; automatically generate a corporate action MT564 swift message based on the pre-designed template and the desired static data sheet: and automatically create an MT564 swift file as output for the generated corporate action MT564 swift message in either a .txt file format or an .xls file format.

According to exemplary embodiments, the template may be configured to link with a corporate action swift generator sheet corresponding to MT565 in the MT56x family of swift among the plurality of corporate action swift generator sheets, and the instructions, when executed, may cause the processor 104 to: automatically generate a corporate action MT565 swift message based on the template and the desired static data sheet: and automatically create an MT565 swift file as output for the generated corporate action MT565 swift message in either a .txt file format or an .xls file format.

According to exemplary embodiments, the template may be configured to link with a corporate action swift generator sheet corresponding to MT566 in the MT56x family of swift among the plurality of corporate action swift generator sheets, and the instructions, when executed, may cause the processor 104 to: automatically generate a corporate action MT566 swift message based on the template and the desired static data sheet; and automatically create an MT566 swift file as output for the generated corporate action MT566 swift message in either a .txt file format or an .xls file format.

According to exemplary embodiments, the template may be configured to link with a corporate action swift generator sheet corresponding to MT567 in the MT56x family of swift among the plurality of corporate action swift generator sheets, and the instructions, when executed, may cause the processor 104 to: automatically generate a corporate action MT567 swift message based on the template and the desired static data sheet: and automatically create an MT567 swift file as output for the generated corporate action MT567 swift message in either a .txt file format or an .xls file format.

According to exemplary embodiments, the instructions, when executed, may cause the processor 104 to override automatically generated corporate action MT56x family of swift message by receiving user input.

According to exemplary embodiments, the instructions, when executed, may cause the processor 104 to update the plurality of static data sheets in a predetermined periodic manner.

According to exemplary embodiments, the instructions, when executed, may cause the processor 104 to: create an MT564 swift file for generated MT564 swift messages as .txt or .xls file format; create an MT565 swift file for generated MT565 swift messages as .txt or .xls file format; create an MT566 swift file for generated MT566 swift messages as .txt or .xls file format; create an MT567 swift file for generated MT567 swift messages as .txt or .xls file format; create an MX20022 swift file for generated MX20022 swift messages as .csv file format; and store, onto a memory, all created swift files in the same folder.

According to exemplary embodiments, the instructions, when executed, may cause the processor 104 to: receive user input corresponding to a desired static data sheet; paste the desired data sheet onto the template; and generate a corporate action swift message in the MT56x family of swift messages based on the desired static data sheet.

According to exemplary embodiments, the instructions, when executed, may cause the processor 104 to: control user input in a manner to detect incorrect or faulty data as input; and block generation of corporate action swift messages with incorrect or faulty data based on the detection of incorrect or faulty data as input.

Figure 6:
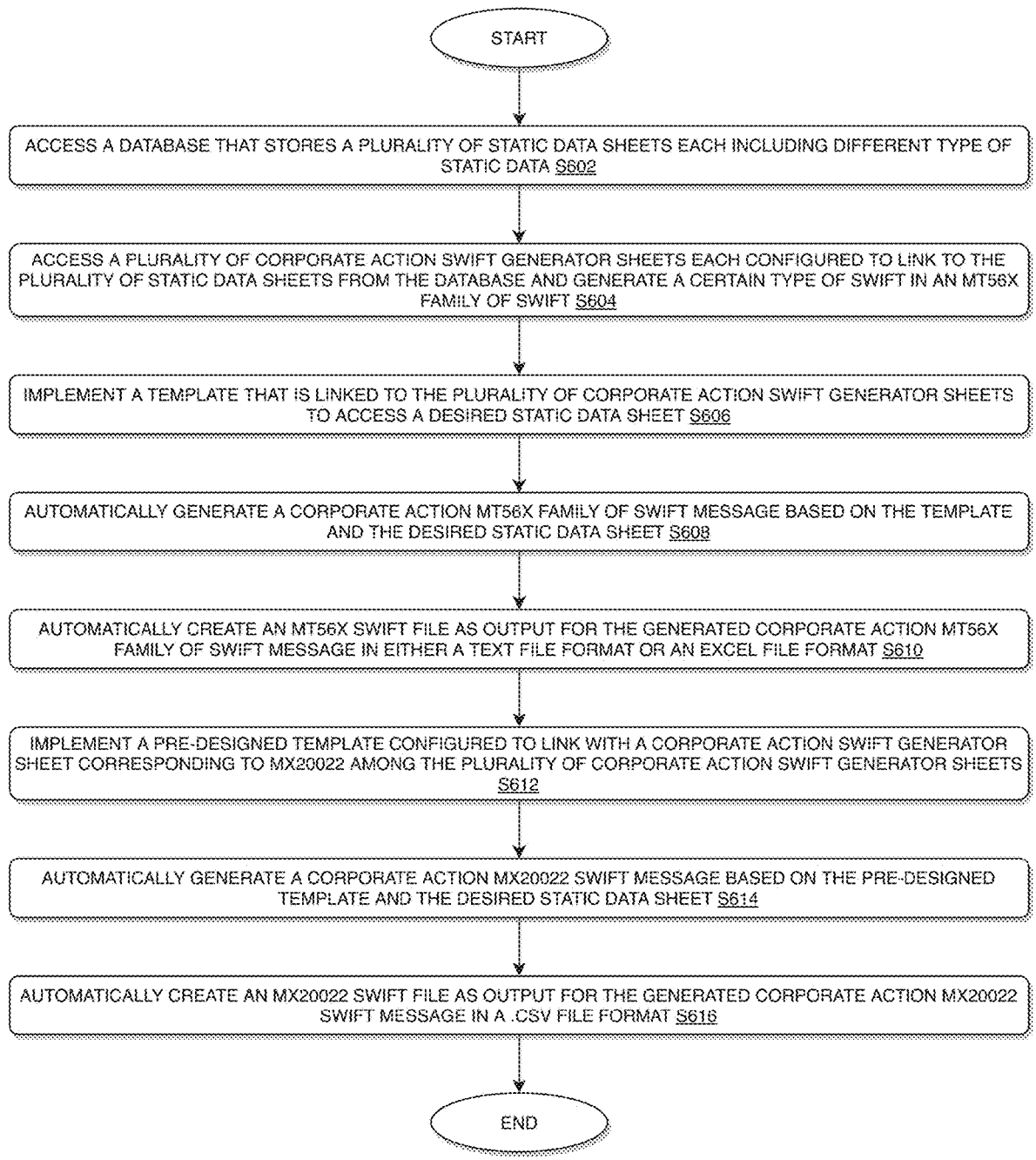
FIG. 6 illustrates a flow chart for implementing a COAC SWIFT generation module in accordance with an exemplary embodiment.

FIG. 6 illustrates a flow chart for implementing a COAC SWIFT generation module for automatically generating or modifying COAC SWIFT messages by utilizing one or more processors and one or more memories in accordance with an exemplary embodiment.

In the process 600 of FIG. 6, at step S602, a database may be accessed that stores a plurality of static data sheets each including different type of static data. At step S604, a plurality of corporate action swift generator sheets may be accessed, each corporate action swift generator sheet may be configured to link to the plurality of static data sheets from the database and generate a certain type of swift in an MT56x family of swift. At step S606, a template may be implemented that is linked to the plurality of corporate action swift generator sheets to access a desired static data sheet. At step S608, a corporate action MT56x family of swift message may be automatically generated or modified based on the template and the desired static data sheet. At step S610, an MT56x swift file may be automatically created as output for the generated corporate action MT56x family of swift message in either a text file format or an excel file format.

According to exemplary embodiments, at step S612, a pre-designed template may be implemented that is configured to link with a corporate action swift generator sheet corresponding to MX20022 among the plurality of corporate action swift generator sheets. At step S614, a corporate action MX20022 swift message may be automatically generated based on the pre-designed template and the desired static data sheet. At step S616, an MX20022 swift file may be automatically created as output for the generated corporate action MX20022 swift message in a .csv file format.

According to exemplary embodiments, the process 600 may further include: implementing code data transformation services as part of the data processing framework.

According to exemplary embodiments, the process 600 may further include: implementing a pre-designed template configured to link with a corporate action swift generator sheet corresponding to MT564 in the MT56x family of swift among the plurality of corporate action swift generator sheets; automatically generating a corporate action MT564 swift message based on the pre-designed template and the desired static data sheet; and automatically creating an MT564 swift file as output for the generated corporate action MT564 swift message in either a .txt file format or an .xls file format.

According to exemplary embodiments, the template may be configured to link with a corporate action swift generator sheet corresponding to MT565 in the MT56x family of swift among the plurality of corporate action swift generator sheets, and the process 600 may further include: automatically generating a corporate action MT565 swift message based on the template and the desired static data sheet; and automatically creating an MT565 swift file as output for the generated corporate action MT565 swift message in either a .txt file format or an .xls file format.

According to exemplary embodiments, the template may be configured to link with a corporate action swift generator sheet corresponding to MT566 in the MT56x family of swift among the plurality of corporate action swift generator sheets, and the process 600 may further include: automatically generating a corporate action MT566 swift message based on the template and the desired static data sheet; and automatically creating an MT566 swift file as output for the generated corporate action MT566 swift message in either a .txt file format or an .xls file format.

According to exemplary embodiments, the template may be configured to link with a corporate action swift generator sheet corresponding to MT567 in the MT56x family of swift among the plurality of corporate action swift generator sheets, and the process 600 may further include: automatically generating a corporate action MT567 swift message based on the template and the desired static data sheet; and automatically creating an MT567 swift file as output for the generated corporate action MT567 swift message in either a .txt file format or an .xls file format.

According to exemplary embodiments, the process 600 may further include: overriding automatically generated corporate action MT56x family of swift message by receiving user input.

According to exemplary embodiments, the process 600 may further include updating the plurality of static data sheets in a predetermined periodic manner.

According to exemplary embodiments, the process 600 may further include: creating an MT564 swift file for generated MT564 swift messages as .txt or .xls file format; creating an MT565 swift file for generated MT565 swift messages as .txt or .xls file format; creating an MT566 swift file for generated MT566 swift messages as .txt or .xls file format; creating an MT567 swift file for generated MT567 swift messages as .txt or .xls file format; creating an MX20022 swift file for generated MX20022 swift messages as .csv file format; and storing, onto a memory, all created swift files in the same folder.

According to exemplary embodiments, the process 600 may further include: receiving user input corresponding to a desired static data sheet: pasting the desired data sheet onto the template; and generating a corporate action swift message in the MT56x family of swift messages based on the desired static data sheet.

According to exemplary embodiments, the process 600 may further include: controlling user input in a manner to detect incorrect or faulty data as input: and blocking generation of corporate action swift messages with incorrect or faulty data based on the detection of incorrect or faulty data as input.

Figure 7:
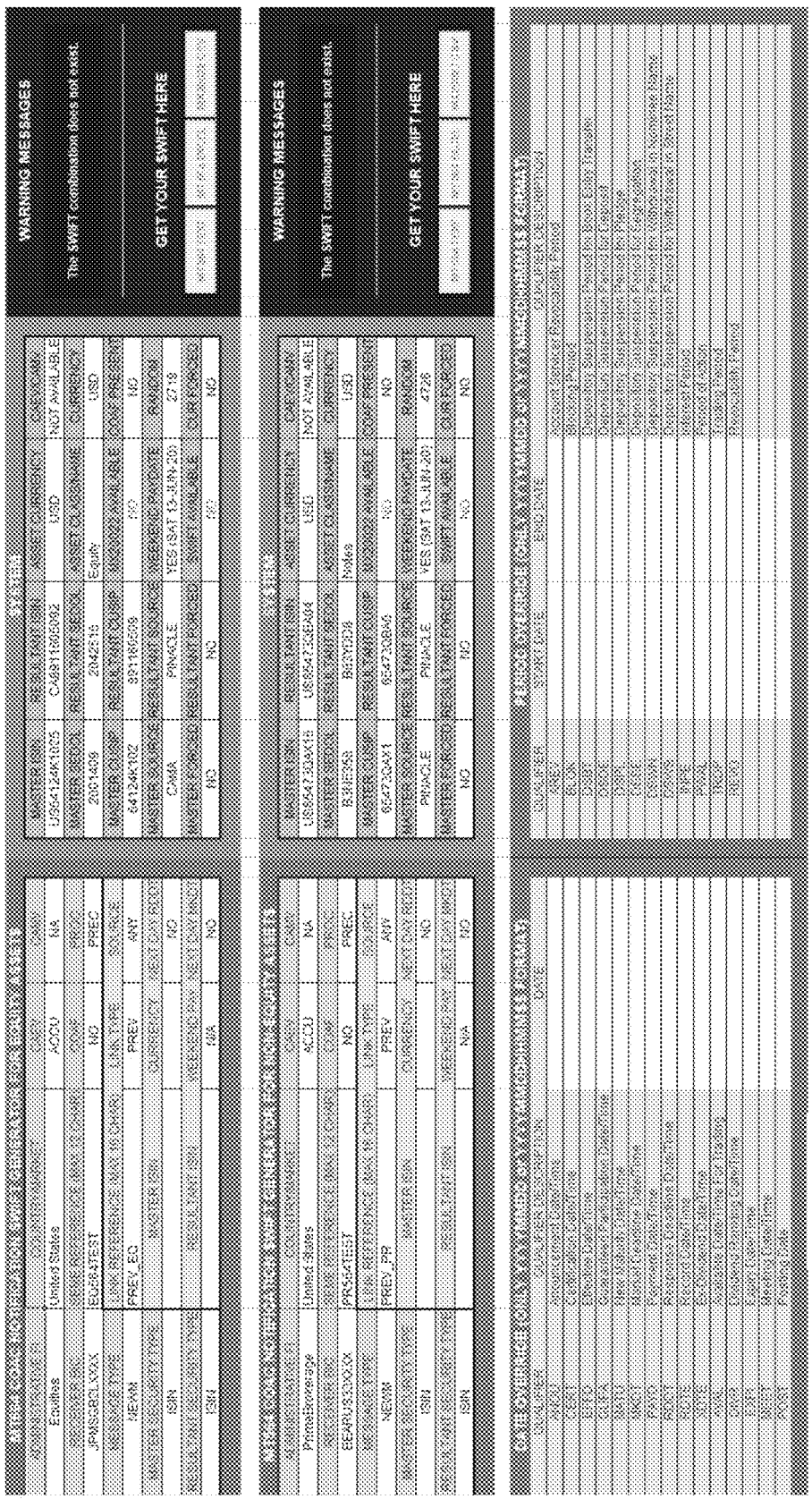
FIG. 7 illustrates an exemplary use case of generating MT564 SWIFT message in accordance with an exemplary embodiment.

FIG. 7 illustrates an exemplary use case 700 of generating MT564 SWIFT message in accordance with an exemplary embodiment. For example, the exemplary use case 700 of generating MT564 SWIFT message may include the following processes.

MT564 GENERATOR SHEET: Using COAC SWIFT Generator to generate MT564/MX20022 SWIFT messages for EQUITY assets (the same applies for Non-Equity assets, only on the box below in the same sheet), the following processes (a-p) may be prompted to a user in the GUI 432 or the user may follow the following recommendations (a-p) by utilizing the GUI 432:

a. Choose your ADMINISTRATIVE FI ($B$3) and do not forget to update your RECEIVER BIC ($B$5) after you change ADMINISTRATIVE FI.

b. Choose your COUNTRY/MARKET ($C$3). MASTER ISIN/SEDOL/CUSIP ($H$3, $H$5, $H$7) and RESULTANT ISIN/SEDOL/CUSIP ($I$3, $I$5, $I$7) will change automatically based on the chosen COUNTRY/MARKET. CURRENCY ($K$5) will also be automatically chosen based on your COUNTRY/MARKET.

ASSET CURRENCY ($J$3) and ASSET CLASS/NAME ($J$5) will be automatically updated. Similarly, MASTER SOURCE ($H$9), and RESULTANT SOURCE ($I$9) will be automatically updated.

c. Choose your CAEV ($D$3). Then choose your CAMV ($E$3) based on the chosen CAEV. If the SWIFT combination exists for MT564, MT564 TEXT and MT564 EXCEL buttons will light up. SWIFT Available ($J$11) will also turn to YES. The WARNING MESSAGES section will no longer show the message "The SWIFT combination does not exist". If available, the CAEV/CAMV combination will appear in CAEV/CAMV ($K$3).

Similarly, if the SWIFT combination exists for MX20022, MX20022 CSV button will light up. MX20022 Available ($J$7) will also turn to YES.

d. Type in your SEME REFERENCE ($C$5). Your final SEME reference will be a concatenation of this text and the random number in RANDOM ($K$9). This will ensure that the SEME reference is always unique.

e. Choose whether you want a COAF reference in COAF ($D$5). Your choice will also be reflected in COAF PRESENT ($K$7).

f. Choose your processing status in PROC ($E$5).

g. Choose your MESSAGE TYPE ($B$7).

h. If your message type is not NEWM, then you will need to type in your LINK REFERENCE ($C$7). You can also change your LINK TYPE ($D$7).

i. You can choose your asset SOURCE ($E$7). While not guaranteed, the COAC SWIFT Generator will try to find an asset with the same source. This will be reflected in MASTER SOURCE ($H$9). RESULTANT SOURCE ($I$9) will not be affected and will be randomly chosen.

j. You can choose your MASTER SECURITY TYPE ($B$9) and RESULTANT SECURITY TYPE ($B$11). Depending on your security type choice, data from either MASTER ISIN, MASTER SEDOL, or MASTER CUSIP ($H$3, $H$5, $H$7) and either RESULTANT ISIN, RESULTANT SEDOL, or RESULTANT CUSIP ($I$3, $I$5, $I$7) will be reflected in the SWIFT message. Also notice that the cell titles in $C$8 and $C$10 will change accordingly.

k. You can override the asset ID in MASTER ISIN/SEDOL/CUSIP ($C$9) and RESULTANT ISIN/SEDOL/CUSIP ($C$11). These changes will also be reflected in MASTER ISIN/SEDOL/CUSIP ($H$3, $H$5, $H$7) and RESULTANT ISIN/SEDOL/CUSIP ($I$3, $I$5, $I$7). Asset ID overrides will also be reflected in MASTER FORCED ($H$11) and RESULTANT FORCED ($I$11).

l. You can override CURRENCY ($D$9). This will be reflected in your SWIFT message and also in CURRENCY ($K$5), and also in CUR FORCED ($K$11).

m. You can choose whether you want a WEEKEND PAY ($D$11). This will be reflected in WEEKEND PAYDATE ($J$9).

n. You can choose whether you want a next-day Record Date and/or Market Date in NEXTDAY RDDT ($E$9) and NEXTDAY MKDT ($E$11).

o. You can override several dates and periods in your MT564/MX20022 SWIFT message in the corresponding boxes in the same sheet and using either YYYYMMDD or YYYYMMDDHHMMSS format.

p. Once any of the MT564 TEXT, MT564 EXCEL, or MX20022 CSV buttons are activated, you can generate your SWIFT message by clicking on them. The SWIFT message will be automatically saved in the same folder as your COAC SWIFT Generator.

Figure 8:
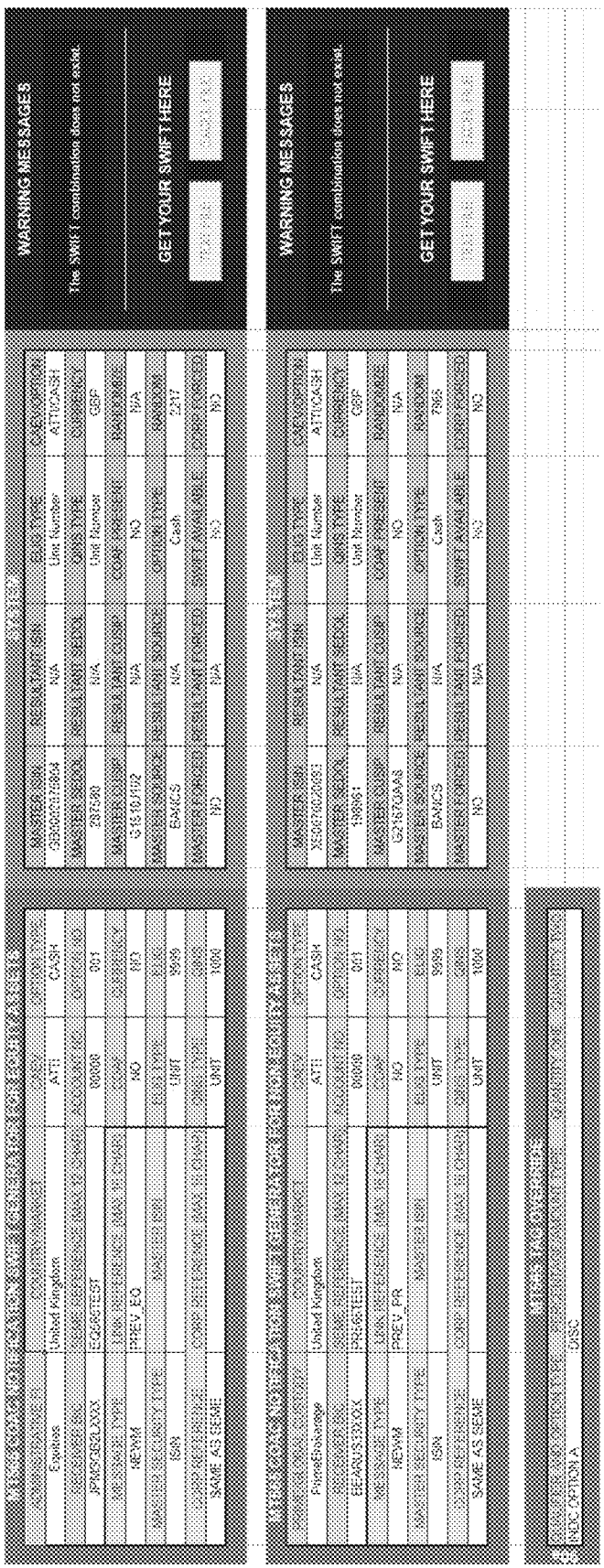
FIG. 8 illustrates an exemplary use case of generating MT565 SWIFT message in accordance with an exemplary embodiment.

FIG. 8 illustrates an exemplary use case 800 of generating MT565 SWIFT message in accordance with an exemplary embodiment. For example, the exemplary use case 800 of generating MT565 SWIFT message may include the following processes.

MT565 GENERATOR SHEET: Using COAC SWIFT Generator to generate MT565 SWIFT messages for EQUITY assets (the same applies for Non-Equity assets, only on the box below in the same sheet), the following processes (A-R) may be prompted to a user in the GUI 432 or the user may follow the following recommendations (A-R) by utilizing the GUI 432:

A. Choose your ADMINISTRATIVE FI ($B$3) and do not forget to update your RECEIVER BIC ($B$5) after you change ADMINISTRATIVE FI.

B. Choose your COUNTRY/MARKET ($C$3). MASTER ISIN/SEDOL/CUSIP ($H$3, $H$5, $H$7) will change automatically based on the chosen COUNTRY/MARKET. CURRENCY ($K$5) will also be automatically chosen based on your COUNTRY/MARKET. MASTER SOURCE ($H$9) will also be automatically updated.

MT565 messages do not have resultant asset IDs and as a result, RESULTANT ISIN/SEDOL/CUSIP ($I$3, $I$5, $I$7) will always show N/A.

C. Choose your CAEV ($D$3). Then choose your OPTION TYPE ($E$3) based on the chosen CAEV. If the SWIFT combination exists for MT565, TEXT FILE and EXCEL FILE buttons will light up. SWIFT Available ($J$11) will also turn to YES. The WARNING MESSAGES section will no longer show the message "The SWIFT combination does not exist". The CAEV/OPTION combination will appear in CAEV/OPTION ($K$3).

Also, a description of your option type will appear in OPTION TYPE ($J$9).

D. Type in your SEME REFERENCE ($C$5). Your final SEME reference will be a concatenation of this text and the random number in RANDOM ($K$9). This will ensure that the SEME reference is always unique.

E. Choose your ACCOUNT NO ($D$5).

F. Choose your OPTION NO ($E$5).

G. Choose your MESSAGE TYPE ($B$7).

H. If your message type is not NEWM, then you will need to type in your LINK REFERENCE ($C$7).

I. Choose whether you want a COAF reference in COAF ($D$7). Your choice will also be reflected in COAF PRESENT ($J$7).

J. You can choose if you want CURRENCY ($E$7) in your SWIFT message. If you choose so, CURRENCY ($K$7) will appear in your SWIFT message.

K. You can choose your MASTER SECURITY TYPE ($B$9). Depending on your security type choice, data from either MASTER ISIN, MASTER SEDOL, or MASTER CUSIP ($H$3, $H$5, $H$7) will be reflected in the SWIFT message. Also notice that the cell title in $C$8 will change accordingly.

L. You can override the asset ID in MASTER ISIN/SEDOL/CUSIP ($C$9). This change will also be reflected in MASTER ISIN/SEDOL/CUSIP ($H$3, $H$5, $H$7). Asset ID override will also be reflected in MASTER FORCED ($H$11).

M. You can change ELIG TYPE ($D$9) and QINS TYPE ($D$11). A description of the chosen ELIG type and QINS type will appear in ELIG TYPE ($J$3) and QINS TYPE ($J$5).

N. You can change ELIG amount and QINS amount in ELIG ($E$9) and QINS ($E$11).

O. You can choose how you want to generate your CORP REFERENCE ($B$11).

P. If you want to generate your CORP reference manually, then you will need to input your CORP REFERENCE ($C$11). Filling this box will also be reflected in CORP FORCED ($K$11).

Q. You can override 90a tag in your MT565 SWIFT message using the bottom box.

R. Once the TEXT FILE or EXCEL FILE buttons are activated, you can generate your SWIFT message by clicking on them. The SWIFT message will be automatically saved in the same folder as your COAC SWIFT Generator.

Figure 9:
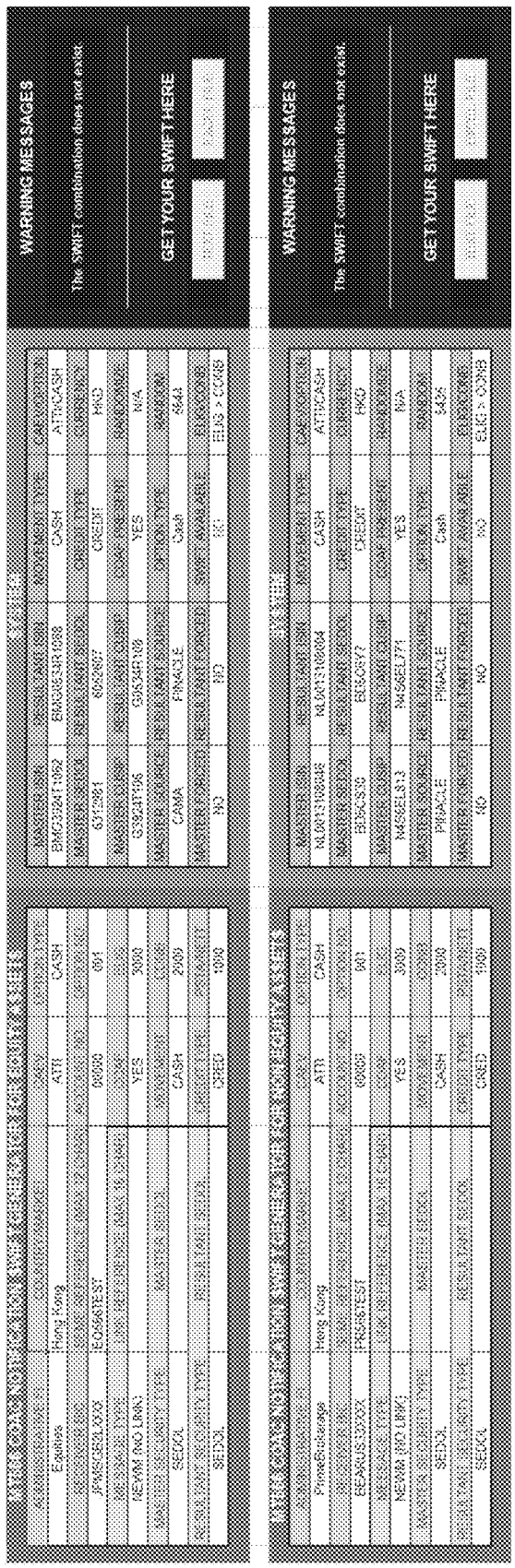
FIG. 9 illustrates an exemplary use case of generating MT566 SWIFT message in accordance with an exemplary embodiment.

FIG. 9 illustrates an exemplary use case 900 of generating MT566 SWIFT message in accordance with an exemplary embodiment. For example, the exemplary use case 900 of generating MT564 SWIFT message may include the following processes.

MT566 GENERATOR SHEET: Using COAC SWIFT Generator to generate MT566 SWIFT messages for EQUITY assets (the same applies for Non-Equity assets, only on the box below in the same sheet), the following processes (A-Q) may be prompted to a user in the GUI 432 or the user may follow the following recommendations (A-Q) by utilizing the GUI 432:

A. Choose your ADMINISTRATIVE FI ($B$3) and do not forget to update your RECEIVER BIC ($B$5) after you change ADMINISTRATIVE FI.

B. Choose your COUNTRY/MARKET ($C$3). MASTER ISIN/SEDOL/CUSIP ($H$3, $H$5, $H$7) and RESULTANT ISIN/SEDOL/CUSIP ($I$3, $I$5, $I$7) will change automatically based on the chosen COUNTRY/MARKET. CURRENCY ($K$5) will also be automatically chosen based on your COUNTRY/MARKET. Similarly, MASTER SOURCE ($H$9), and RESULTANT SOURCE ($I$9) will be automatically updated.

C. Choose your CAEV ($D$3). Then choose your OPTION TYPE ($E$3) based on the chosen CAEV. If the SWIFT combination exists for MT566, TEXT FILE and EXCEL FILE buttons will light up. SWIFT Available ($J$11) will also turn to YES. The WARNING MESSAGES section will no longer show the message "The SWIFT combination does not exist". If available, the CAEV/OPTION combination will appear in CAEV/OPTION ($K$3).

Also, a description of your option type will appear in OPTION TYPE ($J$9).

D. Type in your SEME REFERENCE ($C$5). Your final SEME reference will be a concatenation of this text and the random number in RANDOM ($K$9). This will ensure that the SEME reference is always unique.

E. Choose your ACCOUNT NO ($D$5).

F. Choose your OPTION NO ($E$5).

G. Choose your MESSAGE TYPE ($B$7).

H. If your message type is not NEWM (NO LINK), then you will need to type in your LINK REFERENCE ($C$7).

I. Choose whether you want a COAF reference in COAF ($D$7). Your choice will also be reflected in COAF PRESENT ($K$7).

J. Choose your ELIG amount in ELIG ($E$7).

K. You can choose your MASTER SECURITY TYPE ($B$9) and RESULTANT SECURITY TYPE ($B$11). Depending on your security type choice, data from either MASTER ISIN, MASTER SEDOL, or MASTER CUSIP ($H$3, $H$5, $H$7) and either RESULTANT ISIN, RESULTANT SEDOL, or RESULTANT CUSIP ($I$3, $I$5, $I$7) will be reflected in the SWIFT message. Also notice that the cell titles in $C$8 and $C$10 will change accordingly.

L. You can override the asset ID in MASTER ISIN/SEDOL/CUSIP ($C$9) and RESULTANT ISIN/SEDOL/CUSIP ($C$11). These changes will also be reflected in MASTER ISIN/SEDOL/CUSIP ($H$3, $H$5, $H$7) and RESULTANT ISIN/SEDOL/CUSIP ($I$3, $I$5, $I$7). Asset ID overrides will also be reflected in MASTER FORCED ($H$11) and RESULTANT FORCED ($I$11).

M. Choose your MOVEMENT ($D$9). This will be reflected in MOVEMENT TYPE ($J$3).

N. Choose your CONB amount in CONB ($E$9). The relationship between ELIG and CONB amount will be reflected in ELIG/CONB ($K$11).

O. Choose your CREDIT TYPE ($D$11). This will be reflected in CREDIT TYPE ($J$5).

P. Choose your PSTA and NETT amounts in PSTA/NETT ($E$11).

Q. Once any of the TEXT FILE or EXCEL FILE buttons are activated, you can generate your SWIFT message by clicking on them. The SWIFT message will be automatically saved in the same folder as your COAC SWIFT Generator.

Figure 10:
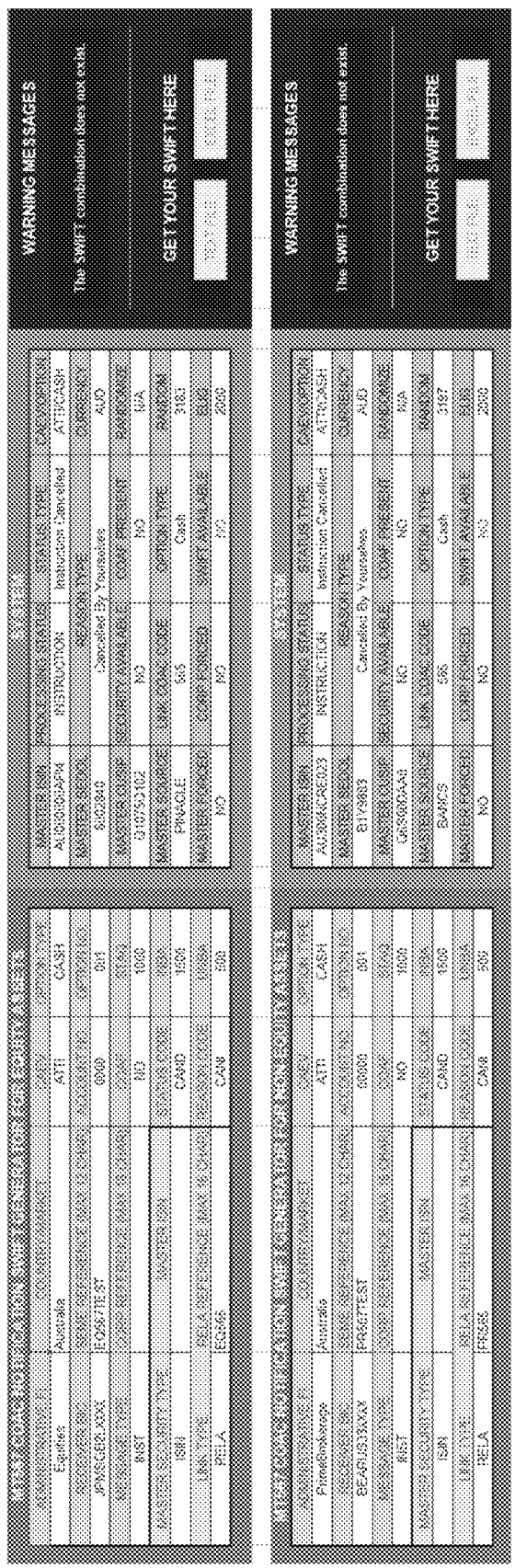
FIG. 10 illustrates an exemplary use case of generating MT567 SWIFT message in accordance with an exemplary embodiment.

FIG. 10 illustrates an exemplary use case 1000 of generating MT567 SWIFT message in accordance with an exemplary embodiment. For example, the exemplary use case 1000 of generating MT564 SWIFT message may include the following processes.

MT567 GENERATOR SHEET: Using COAC SWIFT Generator to generate MT567 SWIFT messages for EQUITY assets (the same applies for Non-Equity assets, only on the box below in the same sheet), the following processes (A-R) may be prompted to a user in the GUI 432 or the user may follow the following recommendations (A-R) by utilizing the GUI 432:

A. Choose your ADMINISTRATIVE FI ($B$3) and do not forget to update your RECEIVER BIC ($B$5) after you change ADMINISTRATIVE FI.

B. Choose your COUNTRY/MARKET ($C$3). MASTER ISIN/SEDOL/CUSIP ($H$3, $H$5, $H$7) will change automatically based on the chosen COUNTRY/MARKET. CURRENCY ($K$5) will also be automatically chosen based on your COUNTRY/MARKET. MASTER SOURCE ($H$9) will also be automatically updated.

C. Choose your CAEV ($D$3). Then choose your OPTION TYPE ($E$3) based on the chosen CAEV. If the SWIFT combination exists for MT567, TEXT FILE and EXCEL FILE buttons will light up. SWIFT Available ($J$11) will also turn to YES. The WARNING MESSAGES section will no longer show the message "The SWIFT combination does not exist". The CAEV/OPTION combination will appear in CAEV/OPTION ($K$3).

Also, a description of your option type will appear in OPTION TYPE ($J$9).

D. Type in your SEME REFERENCE ($C$5). Your final SEME reference will be a concatenation of this text and the random number in RANDOM ($K$9). This will ensure that the SEME reference is always unique.

E. Choose your ACCOUNT NO ($D$5).

F. Choose your OPTION NO ($E$5).

G. Choose your MESSAGE TYPE ($B$7). This will be reflected in PROCESSING STATUS ($I$3). After selecting your message type, do not forget to choose your STATUS CODE ($D$9).

H. Type in your CORP REFERENCE ($C$7). Typing a CORP reference (and therefore deviating from the original CORP Ref.=SEME Ref. formula) will be reflected in CORP FORCED ($I$11).

I. Choose whether you want a COAF reference in COAF ($D$7). Your choice will also be reflected in COAF PRESENT ($J$7).

J. Type in your STAQ amount in STAQ ($E$7).

K. You can choose your MASTER SECURITY TYPE ($B$9). Depending on your security type choice, data from either MASTER ISIN, MASTER SEDOL, or MASTER CUSIP ($H$3, $H$5, $H$7) will be reflected in the SWIFT message. Also notice that the cell title in $C$8 will change accordingly.

L. You can override the asset ID in MASTER ISIN/SEDOL/CUSIP ($C$9). This change will also be reflected in MASTER ISIN/SEDOL/CUSIP ($H$3, $H$5, $H$7). Asset ID override will also be reflected in MASTER FORCED ($H$11) and SECURITY AVAILABLE ($I$7).

M. Choose your STATUS CODE ($D$9). This will be reflected in STATUS TYPE ($J$3). If necessary, after selecting your status code, do not forget to choose your REASON CODE ($D$9).

N. You can change INBA amount and UNBA amount in INBA ($E$9) and UNBA ($E$11). The sum of these two amounts will be reflected in ELIG ($K$11).

O. You can choose your LINK TYPE ($B$11). This will also be reflected in LINK COAC CODE ($I$9). Also notice that the cell title in $C$10 will change accordingly P. Type in your RELA/PREV REFERENCE ($C$11).

Q. Choose your REASON CODE ($D$11). This will be reflected in REASON TYPE ($I$5).

R. Once the TEXT FILE or EXCEL FILE buttons are activated, you can generate your SWIFT message by clicking on them. The SWIFT message will be automatically saved in the same folder as your COAC SWIFT Generator.

Figure 11:
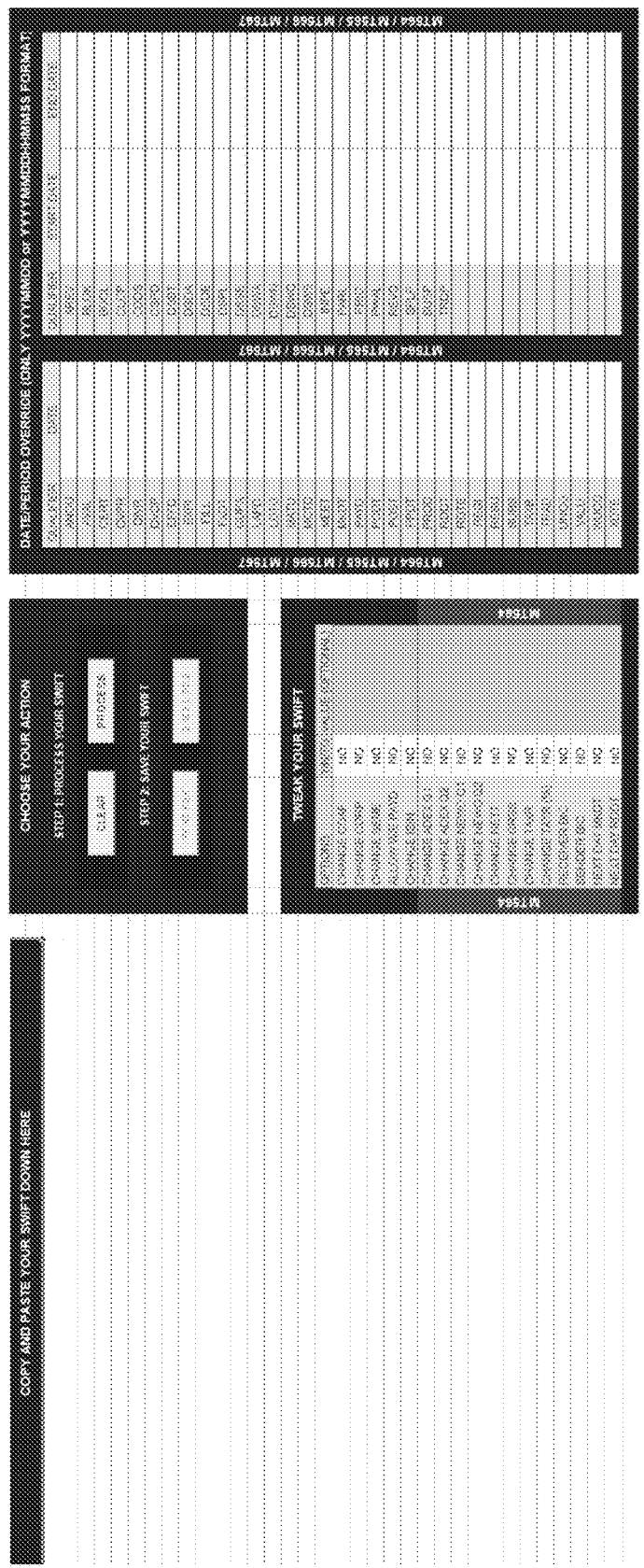
FIG. 11 illustrates an exemplary use case of a SWIFT input sheet in accordance with an exemplary embodiment.

FIG. 11 illustrates an exemplary use case 1100 of SWIFT input sheet in accordance with an exemplary embodiment. For example, the exemplary use case 1100 of SWIFT input sheet may include the following processes.

SWIFT INPUT SHEET: Using COAC SWIFT Generator to update and generate MT564/MT565/MT566/MT567 SWIFT messages (usually based on SWIFT messages obtained from PROD), the following processes (A-V) may be prompted to a user in the GUI 432 or the user may follow the following recommendations (A-V) by utilizing the GUI 432:

A. Copy your SWIFT message in COLUMN A. Note you can copy and paste several SWIFT messages at once and get them all updated as long as you do not exceed 500th row in the sheet. Furthermore, if there are always SWIFT messages in this column, you may use CLEAR button to clear the column.

B. Click on PROCESS button and your SWIFT message will be processed and updated automatically. If no tweaks are chosen, the update will only apply to all the dates and periods in the SWIFT message and the rest of the information will remain unchanged.

C. Once the processing is finished, TEXT FILE and EXCEL FILE buttons will be activated. You can generate your SWIFT message by clicking on them. The SWIFT message will be automatically saved in the same folder as your COAC SWIFT Generator.

D. Tweaking your SWIFT message works as follows: In COLUMN E, NO means you do not want that tweak to be applied, YES means you want the tweak to be applied automatically, and TO means you want to tweak manually, in which case you will need to input your tweak value in COLUMN F.

E. CHANGE COAF ($D$20) will allow you to change your COAF reference.

F. CHANGE CORP ($D$21) will allow you to change your CORP reference.

G. CHANGE SEME ($D$22) will allow you to change your SEME reference.

H. ALLOW W/E PAYDATE ($D$23) will allow you to determine whether you would want a weekend PayDate in your SWIFT.

I. CHANGE ISIN/SEDOL/CUSIP ($D$24) will allow you to change your asset ID.

J. CHANGE ADEX Q1 ($D$25) will allow you to change first ADEX quantity.

K. CHANGE ADEX Q2 ($D$26) will allow you to change second ADEX quantity.

L. CHANGE NEWO Q1 ($D$27) will allow you to change first NEWO quantity.

M. CHANGE NEWO Q2 ($D$28) will allow you to change second NEWO quantity.

N. CHANGE NETT ($D$29) will allow you to change NETT quantity.

O. CHANGE GRSS ($D$30) will allow you to change GRSS quantity.

P. CHANGE TAXR ($D$31) will allow you to change TAXR quantity.

Q. CHANGE TAXR % ($D$32) will allow you to change TAXR Percentage quantity.

R. RECEIVER BIC ($D$33) will allow you to change your receiver BIC.

S. SENDER BIC ($D$33) will allow you to change your sender BIC.

T. NEXT DAY MRKT ($D$34) will allow you to change your Market Date.

U. NEXT DAY RDDT ($D$35) will allow you to change your Record Date.

V. You can override all dates and periods in your MT564/MT565/MT566/MT567 SWIFT message in the corresponding boxes in the same sheet and using either YYYYMMDD or YYYYMMDDHHMMSS format. You can also use ONGO and UKWN tags in this sheet for any date or period.

According to exemplary embodiments as disclosed above in FIGS. 1-11, technical improvements effected by the instant disclosure may include platforms for a COAC SWIFT generation module for automatically generating or modifying COAC SWIFT messages, thereby allowing creation or modification of COAC swift messages in a matter of seconds (i.e., less than 30 seconds) instead of several minutes, but the disclosure is not limited thereto. According to exemplary embodiments as disclosed above in FIGS. 1-11, technical improvements effected by the instant disclosure may further include platforms for a COAC SWIFT generation module for automatically generating or modifying COAC SWIFT messages, thereby resulting the following non limiting exemplary advantages over conventional systems and methods: allowing a user to find all SWIFT messages in one place/platform; requiring minimal input in generating the SWIFT; allowing user to input from drop-down menus, thereby removing possibilities of human error; when user input needs to be free-format text, implementing rules to minimize the human input error (i.e., prompting an automatic error message to the user if the SWIFT message ID is input having more than sixteen (16) characters): allowing certain aspects of the SWIFT generation to be fully automated (i.e., a user may not need to worry about the market and asset ID matching, since by choosing the right market, the COAC SWIFT generation module will automatically generate the corresponding asset ID as well); implementing embedded capabilities where user input may override system input (i.e., when users need their own asset IDs or currencies, they may override system-generated data); when all SWIFT details are selected, saving the SWIFT text file through an one-click operation, etc. Consequently, using the COAC SWIFT generation module of the instant disclosure can save thousands of minutes of user time via automation and human-error minimization across wider CPCS team.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed: rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating corporate action SWIFT (Society for Worldwide Interbank Financial Telecommunication) messages by utilizing one or more processors and one or more memories, the method comprising:
   accessing a database that stores a plurality of static data sheets each including different type of static data;
   accessing a plurality of corporate action SWIFT generator sheets each configured to link to the plurality of static data sheets from the database and generate a certain type of SWIFT in an MT56x family of SWIFT;
   implementing a template that is linked to the plurality of corporate action SWIFT generator sheets to access a desired static data sheet;
   automatically generating a corporate action MT56x family of SWIFT message based on the template and the desired static data sheet; and
   automatically creating an MT56x SWIFT file as output for the generated corporate action MT56x family of SWIFT message in either a text file format or an excel file format; and
   implementing a pre-designed template configured to link with a corporate action SWIFT generator sheet corresponding to MX20022 among the plurality of corporate action SWIFT generator sheets;
   automatically generating a corporate action MX20022 SWIFT message based on the pre-designed template and the desired static data sheet; and
   automatically creating an MX20022 SWIFT file as output for the generated corporate action MX20022 SWIFT message in a .csv file format.

2. The method according to claim 1, wherein the plurality of static data sheets include a static data sheet of asset identifiers, a static data sheet of administrative FI codes, a static data sheet of business identifier codes, and a static data sheet of corporate action event or corporate action mandatory/voluntary or combinations thereof.

3. The method according to claim 1, further comprising:
   implementing a pre-designed template configured to link with a corporate action SWIFT generator sheet corresponding to MT564 in the MT56x family of SWIFT among the plurality of corporate action SWIFT generator sheets;
   automatically generating a corporate action MT564 SWIFT message based on the pre-designed template and the desired static data sheet; and
   automatically creating an MT564 SWIFT file as output for the generated corporate action MT564 SWIFT message in either a .txt file format or an .xls file format.

4. The method according to claim 1, wherein the template is configured to link with a corporate action SWIFT generator sheet corresponding to MT565 in the MT56x family of SWIFT among the plurality of corporate action SWIFT generator sheets, and the method further comprising:
   automatically generating a corporate action MT565 SWIFT message based on the template and the desired static data sheet; and
   automatically creating an MT565 SWIFT file as output for the generated corporate action MT565 SWIFT message in either a .txt file format or an .xls file format.

5. The method according to claim 1, wherein the template is configured to link with a corporate action SWIFT generator sheet corresponding to MT566 in the MT56x family of SWIFT among the plurality of corporate action SWIFT generator sheets, and the method further comprising:
   automatically generating a corporate action MT566 SWIFT message based on the template and the desired static data sheet; and
   automatically creating an MT566 SWIFT file as output for the generated corporate action MT566 SWIFT message in either a .txt file format or an .xls file format.

6. The method according to claim 1, wherein the template is configured to link with a corporate action SWIFT generator sheet corresponding to MT567 in the MT56x family of SWIFT among the plurality of corporate action SWIFT generator sheets, and the method further comprising:
   automatically generating a corporate action MT567 SWIFT message based on the template and the desired static data sheet; and
   automatically creating an MT567 SWIFT file as output for the generated corporate action MT567 SWIFT message in either a .txt file format or an .xls file format.

7. The method according to claim 1, further comprising:
   overriding automatically generated corporate action MT56x family of SWIFT message by receiving user input.

8. The method according to claim 1, further comprising:
   updating the plurality of static data sheets in a predetermined periodic manner.

9. The method according to claim 1, further comprising:
   creating an MT564 SWIFT file for generated MT564 SWIFT messages;
   creating an MT565 SWIFT file for generated MT565 SWIFT messages;
   creating an MT566 SWIFT file for generated MT566 SWIFT messages;
   creating an MT567 SWIFT file for generated MT567 SWIFT messages;
   creating an MX20022 SWIFT file for generated MX20022 SWIFT messages; and
   storing, onto a memory, all created SWIFT files in the same folder as .csg file format.

10. The method according to claim 1, further comprising:
    receiving user input corresponding to a desired static data sheet;
    pasting the desired data sheet onto the template; and
    generating a corporate action SWIFT message in the MT56x family of SWIFT messages based on the desired static data sheet.

11. The method according to claim 10, further comprising:
    controlling user input in a manner to detect incorrect or faulty data as input; and
    blocking generation of corporate action SWIFT messages with incorrect or faulty data based on the detection of incorrect or faulty data as input.

12. A system for generating corporate action SWIFT (Society for Worldwide Interbank Financial Telecommunication) messages, comprising:
    a database that stores a plurality of static data sheets each including different type of static data; and
    a processor operatively connected to the database via a communication network, wherein the processor is configured to:
    access a plurality of corporate action SWIFT generator sheets each configured to link to the plurality of static data sheets from the database and generate a certain type of SWIFT in an MT56x family of SWIFT;

implement a template that is linked to the plurality of corporate action SWIFT generator sheets to access a desired static data sheet;

automatically generate a corporate action MT56x family of SWIFT message based on the template and the desired static data sheet;

automatically create an MT56x SWIFT file as output for the generated corporate action MT56x family of SWIFT message in either a text file format or an excel file format; and implement a pre-designed template configured to link with a corporate action SWIFT generator sheet corresponding to MX20022 among the plurality of corporate action SWIFT generator sheets;

automatically generate a corporate action MX20022 SWIFT message based on the pre-designed template and the desired static data sheet; and automatically create an MX20022 SWIFT file as output for the generated corporate action MX20022 SWIFT message in a .csv file format.

13. The system according to claim 12, wherein the plurality of static data sheets include a static data sheet of asset identifiers, a static data sheet of administrative FI codes, a static data sheet of business identifier codes, and a static data sheet of corporate action event or corporate action mandatory/voluntary or combinations thereof.

14. The system according to claim 12, wherein the processor is further configured to:
create an MT564 SWIFT file for generated MT564 SWIFT messages;
create an MT565 SWIFT file for generated MT565 SWIFT messages;
create an MT566 SWIFT file for generated MT566 SWIFT messages;
create an MT567 SWIFT file for generated MT567 SWIFT messages;
create an MX20022 SWIFT file for generated MX20022 SWIFT messages; and
store, onto a memory, all created SWIFT files in the same folder as .csg file format.

15. The system according to claim 12, wherein the processor is further configured to:
receive user input corresponding to a desired static data sheet;
paste the desired data sheet onto the template; and
generate a corporate action SWIFT message in the MT56x family of SWIFT messages based on the desired static data sheet.

16. The system according to claim 15, wherein the processor is further configured to:
control the user input in a manner to detect incorrect or faulty data as input; and
block generation of corporate action SWIFT messages with incorrect or faulty data based on the detection of incorrect or faulty data as input.

17. A non-transitory computer readable medium configured to store instructions for generating corporate action SWIFT (Society for Worldwide Interbank Financial Telecommunication) messages, wherein when executed, the instructions cause a processor to perform the following:
accessing a database that stores a plurality of static data sheets each including different type of static data;
accessing a plurality of corporate action SWIFT generator sheets each configured to link to the plurality of static data sheets from the database and generate a certain type of SWIFT in an MT56x family of SWIFT;
implementing a template that is linked to the plurality of corporate action SWIFT generator sheets to access a desired static data sheet;
automatically generating a corporate action MT56x family of SWIFT message based on the template and the desired static data sheet; and
automatically creating an MT56x SWIFT file as output for the generated corporate action MT56x family of SWIFT message in either a text file format or an excel file format; and
implementing a pre-designed template configured to link with a corporate action SWIFT generator sheet corresponding to MX20022 among the plurality of corporate action SWIFT generator sheets;
automatically generating a corporate action MX20022 SWIFT message based on the pre-designed template and the desired static data sheet; and
automatically creating an MX20022 SWIFT file as output for the generated corporate action MX20022 SWIFT message in a .csv file format.

18. The non-transitory computer readable medium according to claim 17, wherein when executed, the instructions further cause the processor to perform the following:
implementing a pre-designed template configured to link with a corporate action SWIFT generator sheet corresponding to MT564 in the MT56x family of SWIFT among the plurality of corporate action SWIFT generator sheets;
automatically generating a corporate action MT564 SWIFT message based on the pre-designed template and the desired static data sheet; and
automatically creating an MT564 SWIFT file as output for the generated corporate action MT564 SWIFT message in either a .txt file format or an .xls file format.

19. The non-transitory computer readable medium according to claim 17, wherein when executed, the instructions further cause the processor to perform the following:
receiving user input corresponding to a desired static data sheet;
pasting the desired data sheet onto the template; and
generating a corporate action SWIFT message in the MT56x family of SWIFT messages based on the desired static data sheet.

20. The non-transitory computer readable medium according to claim 17, wherein when executed, the instructions further cause the processor to perform the following:
controlling user input in a manner to detect incorrect or faulty data as input; and
blocking generation of corporate action SWIFT messages with incorrect or faulty data based on the detection of incorrect or faulty data as input.

* * * * *